United States Patent [19]
Adams et al.

[11] Patent Number: 5,765,669
[45] Date of Patent: Jun. 16, 1998

[54] REVERSIBLE, INFINITELY VARIABLE WEDGING ELEMENT, FORCE TRANSFER DEVICE

[75] Inventors: Daniel T. Adams; Eugene F. Duval, both of Menlo Park, Calif.

[73] Assignee: DWBH Ventures Ltd., Nassau, Bahamas

[21] Appl. No.: 592,229

[22] Filed: Jan. 26, 1996

[51] Int. Cl.⁶ .................. F16D 41/066; F16D 41/069; B25B 13/46

[52] U.S. Cl. .................. 192/44; 192/43; 192/45; 192/45.1

[58] Field of Search .................. 192/43, 44, 45, 192/45.1, 41 A

[56] References Cited

U.S. PATENT DOCUMENTS

| | | |
|---|---|---|
| 951,056 | 3/1910 | Clark . |
| 1,175,300 | 3/1916 | Ross . |
| 1,213,303 | 1/1917 | Valentine . |
| 1,655,865 | 1/1928 | Hooper . |
| 1,706,867 | 3/1929 | Andrade . |
| 1,852,974 | 4/1932 | King . |
| 1,859,600 | 5/1932 | Prettyman . |
| 1,869,154 | 7/1932 | King . |
| 1,888,885 | 11/1932 | Pepperdine . |
| 1,983,123 | 12/1934 | Dodge . |
| 2,003,155 | 5/1935 | Pfauser . |
| 2,058,855 | 10/1936 | Chapman . |
| 2,061,288 | 11/1936 | Murray . |
| 2,104,320 | 1/1938 | Fischer .................. 192/44 |
| 2,123,684 | 7/1938 | Rabe . |
| 2,139,650 | 12/1938 | Anderson . |
| 2,153,988 | 4/1939 | Padgett . |
| 2,172,653 | 9/1939 | Flogaus . |
| 2,191,763 | 2/1940 | Casse . |
| 2,228,888 | 1/1941 | Rock . |
| 2,262,330 | 11/1941 | MacNeil et al. .................. 192/44 X |
| 2,289,019 | 7/1942 | Jessen .................. 192/44 X |
| 2,407,558 | 9/1946 | Kress . |
| 2,408,335 | 9/1946 | Oliver . |
| 2,427,120 | 9/1947 | Blair . |
| 2,446,776 | 8/1948 | Matson . |
| 2,497,361 | 2/1950 | Kesterton . |
| 2,542,241 | 2/1951 | Fors . |
| 2,571,939 | 10/1951 | Pfauser . |
| 2,584,256 | 2/1952 | Brown . |
| 2,597,241 | 5/1952 | Gruenberg . |
| 2,630,896 | 3/1953 | Dodge . |
| 2,670,825 | 3/1954 | Cherry . |
| 2,701,490 | 2/1955 | Griparis . |
| 2,701,977 | 2/1955 | Stone . |
| 2,703,030 | 3/1955 | Marvin . |
| 2,707,540 | 5/1955 | Morris . |
| 2,722,149 | 11/1955 | Henley . |
| 2,735,324 | 2/1956 | Goldwater . |
| 2,737,275 | 3/1956 | Szady . |
| 2,748,912 | 6/1956 | Banker . |
| 2,757,564 | 8/1956 | Reaves . |
| 2,758,493 | 8/1956 | Goldwater . |

(List continued on next page.)

OTHER PUBLICATIONS

"Driveline components", Machine Design, Jun. 1989, p. 170.

Formsprag Over–running Clutches, Warner Electric, 1990, 13 pages.

Primary Examiner—Rodney H. Bonck
Attorney, Agent, or Firm—Fliesler, Dubb, Meyer & Lovejoy

[57] ABSTRACT

A force transfer device 30 includes an inner race 40 and an outer race 38 and a plurality of reversible wedging elements 34 located between the inner and outer races. This device 30 allows for continuous force transfer between the inner and outer race. This device 30 further allows for locking the inner race 40 relative to the outer race 38 in infinitely varying positions. The device 30 includes scallops on at least one race which scallops are of complex shape in order to manage wedging of the wedging elements and surface stresses between the wedging elements and the race contact surfaces. The device 30 is also reversible.

2 Claims, 26 Drawing Sheets

U.S. PATENT DOCUMENTS

| | | |
|---|---|---|
| 2,815,837 | 12/1957 | Morgan . |
| 2,815,838 | 12/1957 | Dodge . |
| 2,836,273 | 5/1958 | Odlum . |
| 2,860,750 | 11/1958 | Avanzati . |
| 2,865,228 | 12/1958 | Weismann . |
| 2,881,886 | 4/1959 | Troendly . |
| 2,900,058 | 8/1959 | Cromwell . |
| 2,902,126 | 9/1959 | Winchell . |
| 2,910,159 | 10/1959 | Nielsen . |
| 2,919,000 | 12/1959 | Claytor ................................. 192/44 X |
| 2,957,377 | 10/1960 | Hare . |
| 2,963,929 | 12/1960 | Barnes . |
| 2,970,489 | 2/1961 | Eason . |
| 2,981,389 | 4/1961 | Kilness . |
| 3,006,447 | 10/1961 | Irwin . |
| 3,019,682 | 2/1962 | Hare . |
| 3,019,872 | 2/1962 | Morris . |
| 3,019,873 | 2/1962 | Ferris . |
| 3,049,205 | 8/1962 | Ferris . |
| 3,049,206 | 8/1962 | Zlotek . |
| 3,078,973 | 2/1963 | Kilness . |
| 3,187,863 | 6/1965 | Giometti . |
| 3,187,864 | 6/1965 | Tonkin . |
| 3,233,481 | 2/1966 | Bacon . |
| 3,265,171 | 8/1966 | Kilness . |
| 3,356,117 | 12/1967 | Wagner . |
| 3,362,267 | 1/1968 | Rozmus . |
| 3,393,587 | 7/1968 | Jolliff . |
| 3,437,185 | 4/1969 | Daugherty . |
| 3,437,186 | 4/1969 | Roper . |
| 3,438,291 | 4/1969 | Bergquist . |
| 3,443,672 | 5/1969 | Giese . |
| 3,467,231 | 9/1969 | Haznar . |
| 3,476,226 | 11/1969 | Massey ................................. 192/44 X |
| 3,532,012 | 10/1970 | Pryor . |
| 3,532,013 | 10/1970 | Haznar . |
| 3,572,188 | 3/1971 | Christian . |
| 3,586,143 | 6/1971 | Hutchinson . |
| 3,608,398 | 9/1971 | Segawa . |
| 3,608,402 | 9/1971 | Rainey . |
| 3,621,739 | 11/1971 | Seablom . |
| 3,638,519 | 2/1972 | Rebold . |
| 3,650,165 | 3/1972 | Wolfe . |
| 3,651,908 | 3/1972 | Oldfield . |
| 3,656,824 | 4/1972 | Ullberg . |
| 3,659,484 | 5/1972 | Scodeller . |
| 3,688,610 | 9/1972 | Vlasin . |
| 3,693,484 | 9/1972 | Sanderson, Jr. . |
| 3,707,893 | 1/1973 | Hofman . |
| 3,733,936 | 5/1973 | Flynn . |
| 3,747,966 | 7/1973 | Wilkes . |
| 3,783,703 | 1/1974 | Trimble . |
| 3,819,019 | 6/1974 | Timtner . |
| 3,822,951 | 7/1974 | Bornzin . |
| 3,881,376 | 5/1975 | Wright . |
| 3,952,617 | 4/1976 | Gegg . |
| 3,958,470 | 5/1976 | Lee . |
| 3,990,555 | 11/1976 | Carullo . |
| 4,004,666 | 1/1977 | Hinojosa . |
| 4,051,935 | 10/1977 | Nakayama . |
| 4,063,626 | 12/1977 | Solomon . |
| 4,123,953 | 11/1978 | Corbacho, Jr. . |
| 4,137,801 | 2/1979 | Imperio . |
| 4,258,595 | 3/1981 | Ramsey . |
| 4,262,561 | 4/1981 | Mize . |
| 4,277,989 | 7/1981 | Tracy . |
| 4,277,990 | 7/1981 | Hall . |
| 4,280,379 | 7/1981 | Chow . |
| 4,289,414 | 9/1981 | Recker . |
| 4,307,632 | 12/1981 | Penner . |
| 4,308,769 | 1/1982 | Rantanen . |
| 4,339,970 | 7/1982 | Enstrom . |
| 4,429,598 | 2/1984 | Tucker . |
| 4,431,334 | 2/1984 | Cleveland . |
| 4,457,416 | 7/1984 | Kutzler . |
| 4,485,700 | 12/1984 | Colvin . |
| 4,491,043 | 1/1985 | Dempsey . |
| 4,497,227 | 2/1985 | Stasiek . |
| 4,553,453 | 11/1985 | Dempsey . |
| 4,561,329 | 12/1985 | Lack . |
| 4,631,988 | 12/1986 | Colvin . |
| 4,669,339 | 6/1987 | Cartwright . |
| 4,693,351 | 9/1987 | Adolfsson . |
| 4,699,028 | 10/1987 | Bosque . |
| 4,770,072 | 9/1988 | Neuhaus . |
| 4,781,083 | 11/1988 | Cummings . |
| 4,819,775 | 4/1989 | Witt . |
| 4,880,093 | 11/1989 | Message . |
| 4,934,220 | 6/1990 | Slusar . |
| 4,938,108 | 7/1990 | Mekler . |
| 5,007,311 | 4/1991 | Lee . |
| 5,007,514 | 4/1991 | Hattori et al. ................................. 192/45 |
| 5,010,792 | 4/1991 | Clarno . |
| 5,052,533 | 10/1991 | Carey . |
| 5,101,946 | 4/1992 | Lederman ................................. 192/45 |
| 5,235,878 | 8/1993 | Young ................................. 192/44 X |

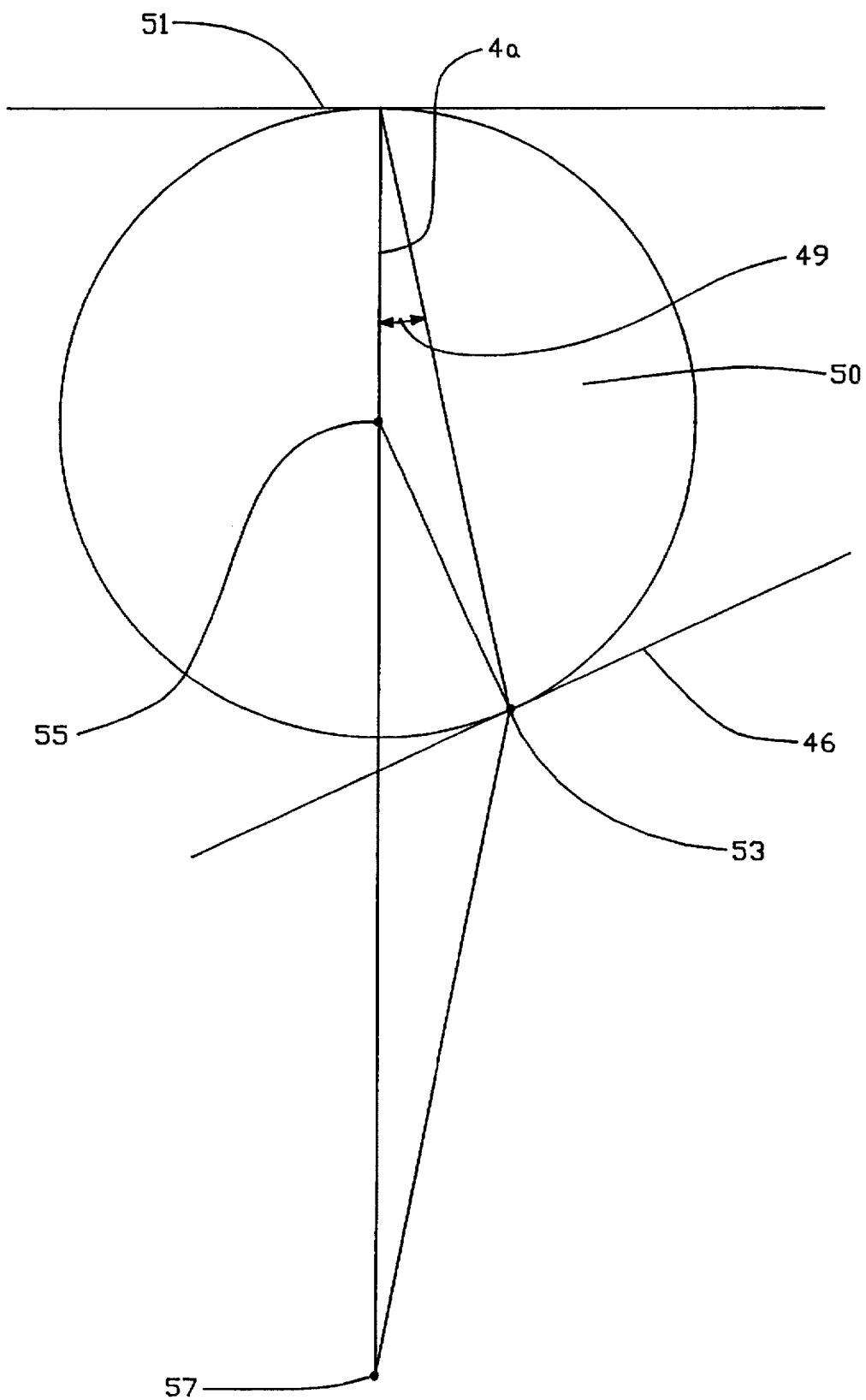
FIG.—4a

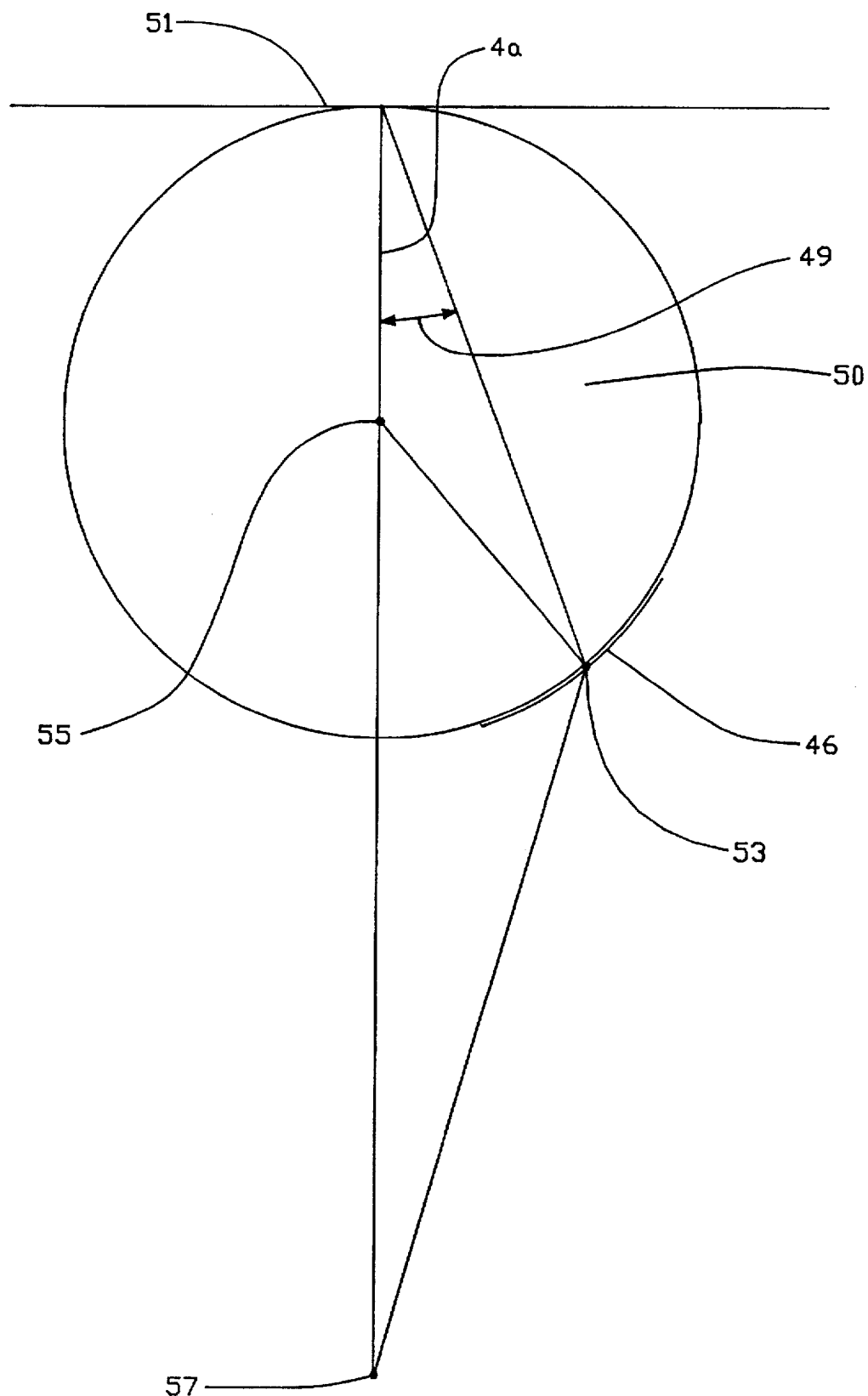
FIG.—4b

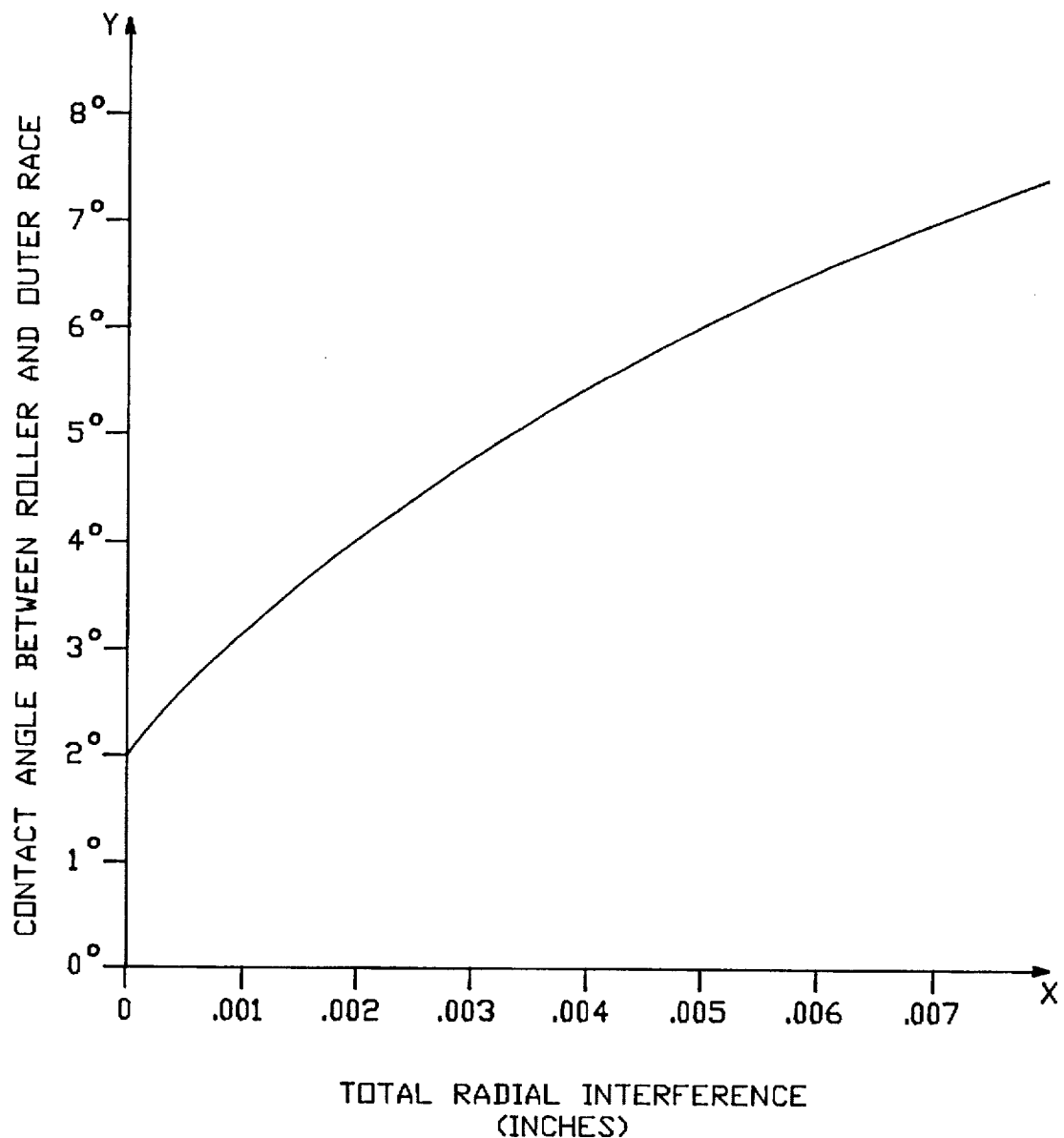
FIG.—5

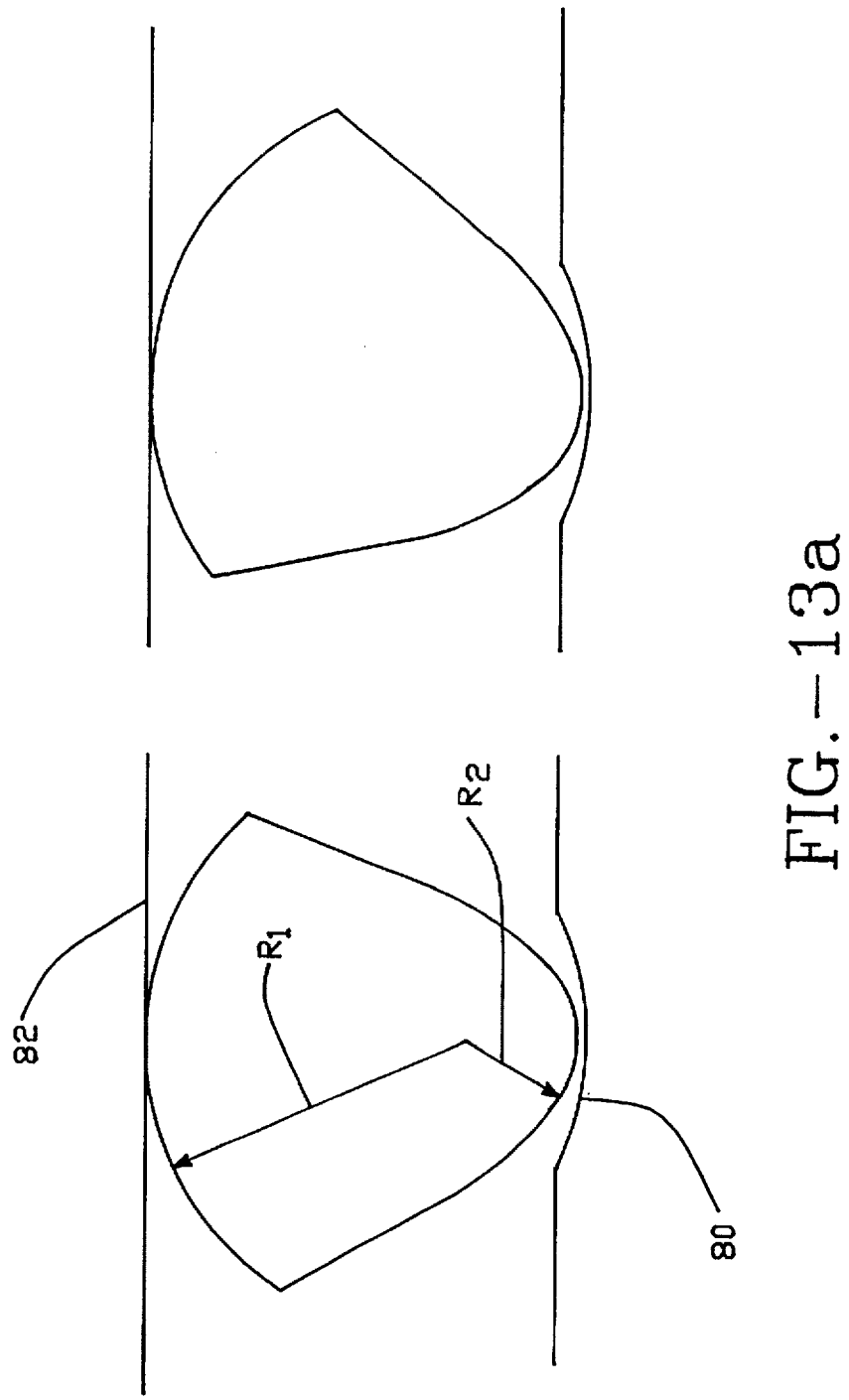
FIG.—13a

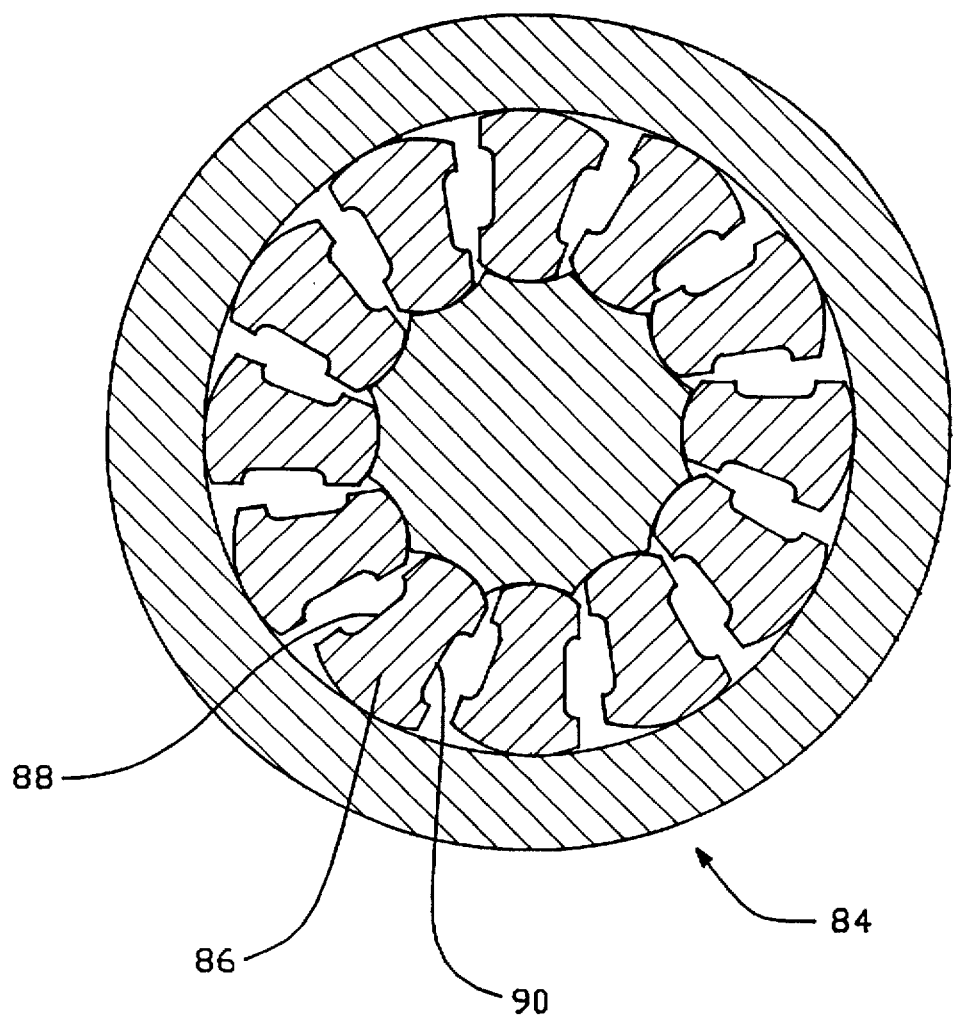
FIG.—14

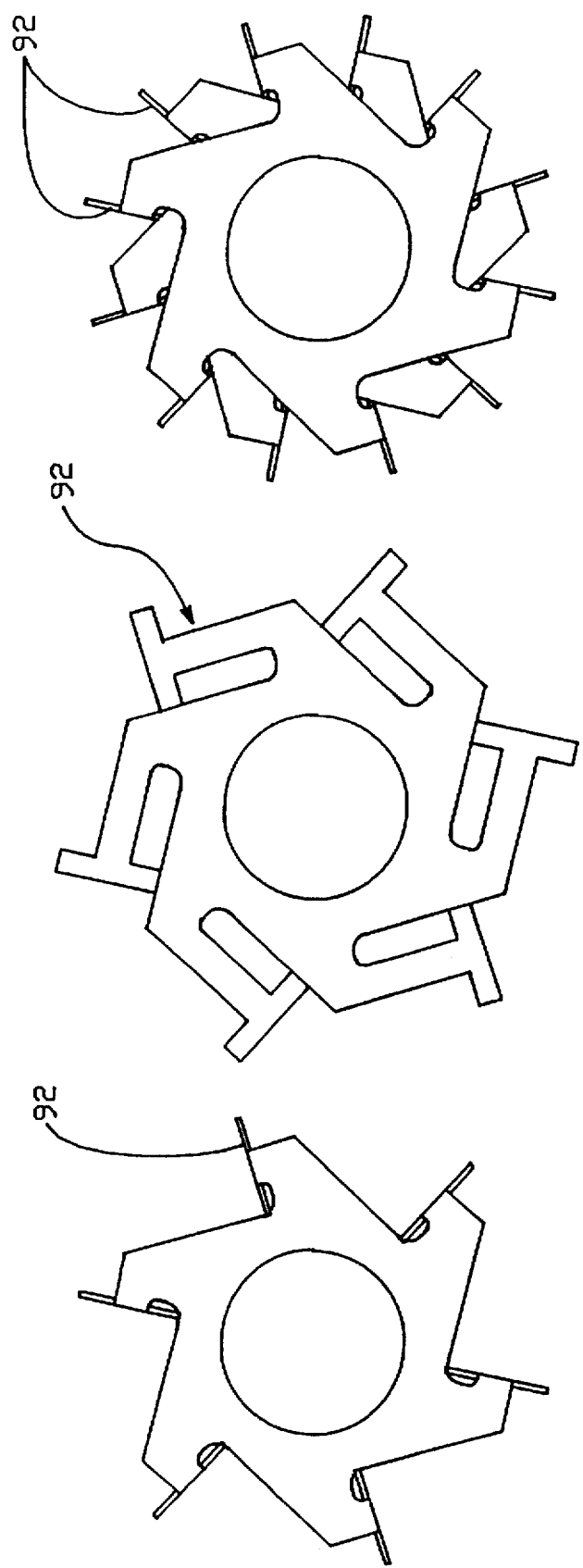

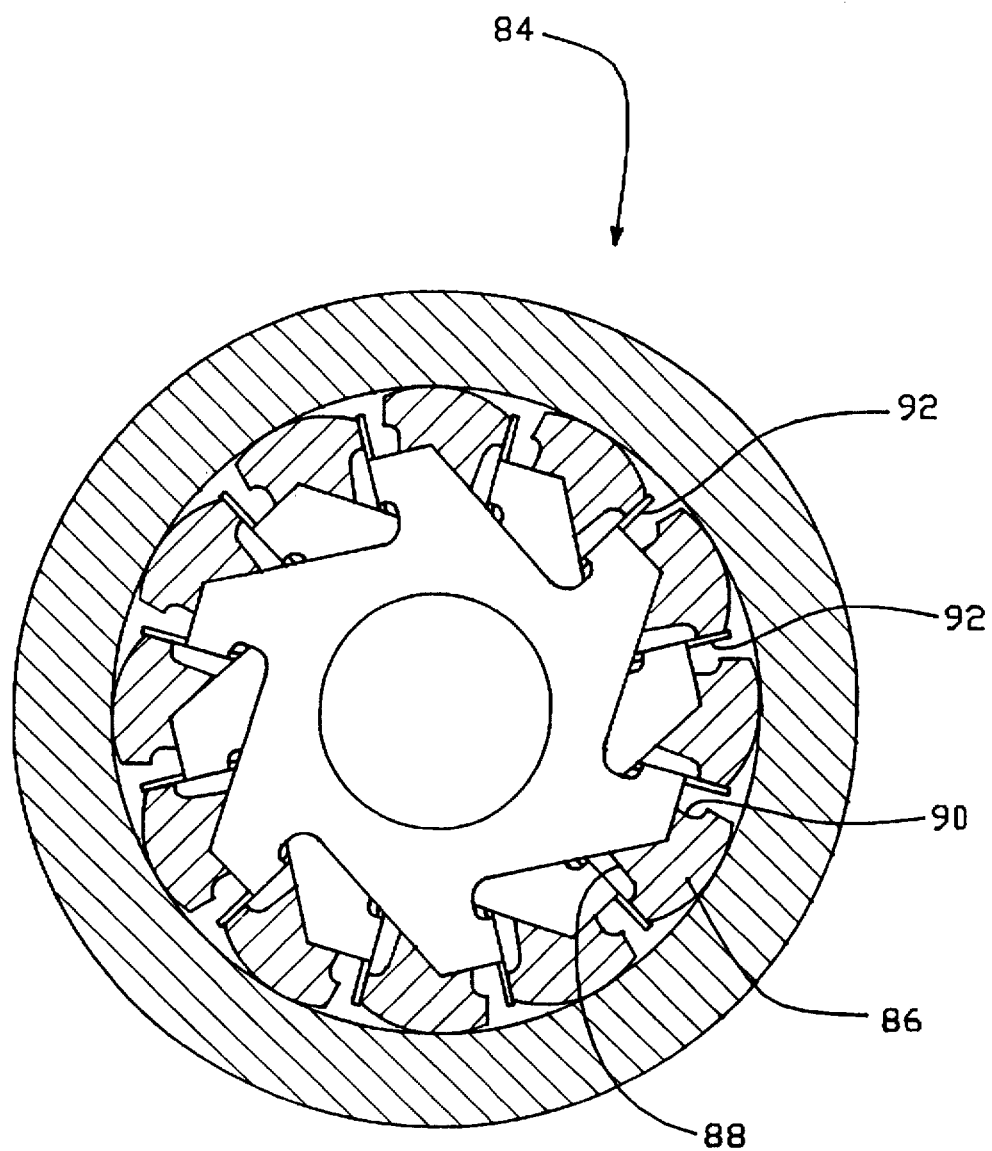
FIG.—16

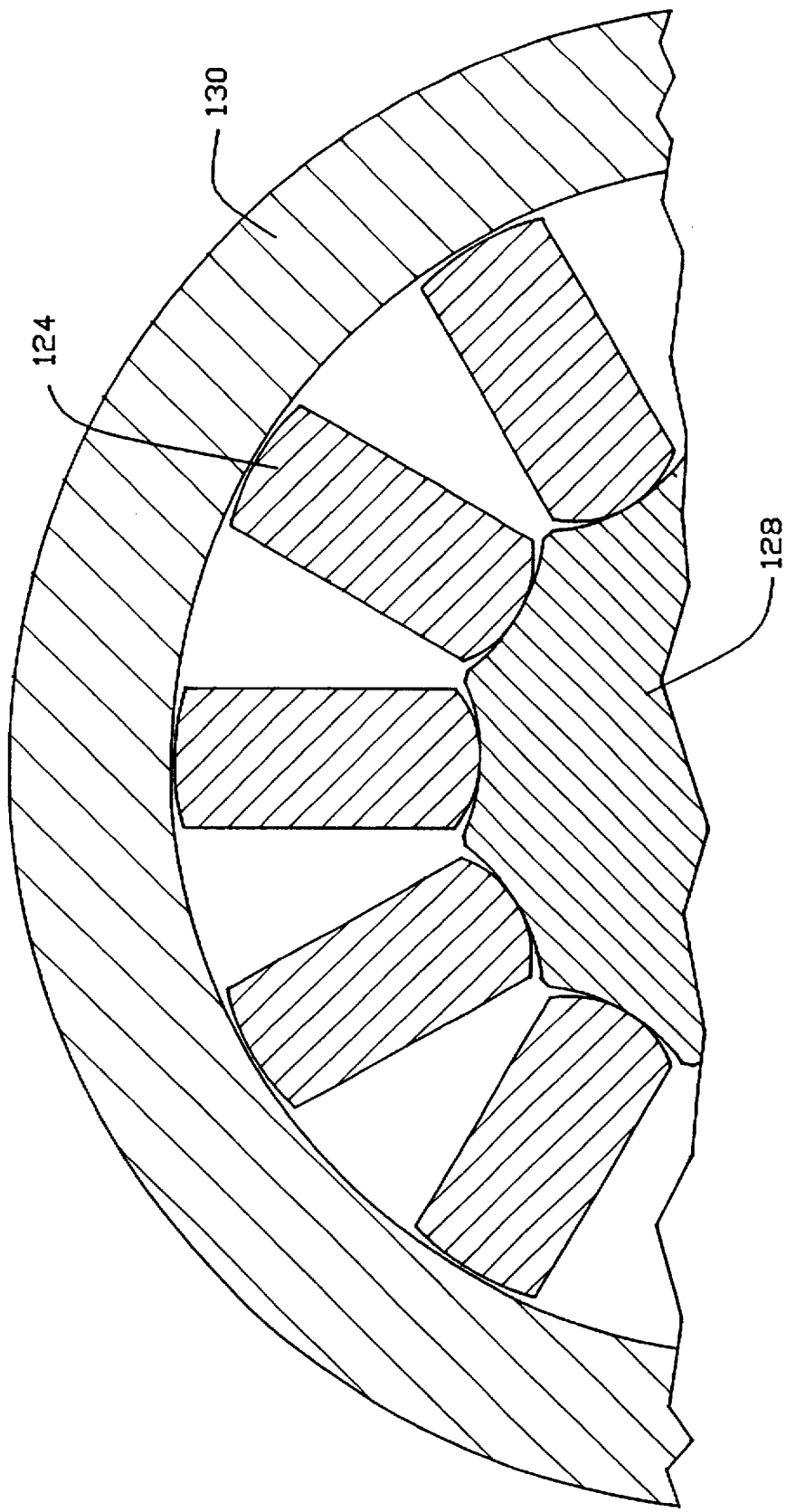

5,765,669

REVERSIBLE, INFINITELY VARIABLE WEDGING ELEMENT, FORCE TRANSFER DEVICE

FIELD OF THE INVENTION

The present invention is directed to a force or torque transfer device which can be used, by way of example only, as a wrench or a clutch.

BACKGROUND OF THE INVENTION

Extensive prior art exists in the field of interchangeable socket wrenches to either tighten or loosen mechanical fasteners. The majority of the manually operated drivers use a ratchet mechanism to eliminate wrench removal and repositioning after each swing of the tool. The ratchet is limited to some discrete incrementing angle due to the nature of the mechanism, and this small angle multiplied by the length of the handle creates a minimum use arc. In tight spaces, a ratchet becomes useless because the user cannot swing the handle far enough to get to the next ratchet tooth without bumping into surrounding obstacles. In addition, the ratchet pawl engaging spring force adds drag to the mechanism which is greater than the free spinning torque of many loosened fasteners. Thus the ratchet becomes useless while the fastener turning torque remains uncomfortably stiff to turn by hand.

In addition to the prior art existing with respect to the above discussed wrenches, there is a field of art which employs sprags in order to transfer force between an inner and outer race. A sprag is a device located between races that transfers power from one race to another due to the wedging action. Typically, in a clutch arrangement using a sprag, rotation of the race in the opposite direction causes the sprags to disengage so that the clutch no longer transfers force between the races.

SUMMARY OF THE INVENTION

The present invention uses a reversible wedging element mechanism such as a clutch or wrench to transmit torque in one direction and be free-wheeling in the other. Because the wedging element mechanism has infinite engagement with no backlash in the driving direction, any arc of, for example, wrench motion can be used to drive the fastener regardless of the angle magnitude. This is due to the toothless design of the inventive force transfer mechanism. The direction of operation can be switched with a simple lever.

Accordingly, the present invention improves on the prior art by providing for a forced transfer device which is reversible and continuous. The device is continuous in that it includes a mechanism located between an inner race and an outer race for locking the position of the inner race relative to the outer race in infinitely varying positions.

In one aspect of the invention, a force transfer device which can transfer linear as well as torque type forces comprises an inner race and an outer race and a plurality of wedging elements located between the inner race and the outer race. This force transfer device can include for example a wrench or a clutch.

Embodiments can use either rollers or sprags or cylinders or a combination of some or all of these as wedging elements and be within the spirit of the invention. Further, the use of the term wedging element means that rollers and/or sprags and/or cylinders can be used in the described embodiment. Further, any embodiment described with respect to one of rollers or sprags or cylinders is intended to cover a similar embodiment which is developed with the other of rollers or sprags or cylinders.

In another aspect of the invention, the inner race includes a plurality of scallops.

In a further aspect of the invention, the scallops can be any one of concave, convex, flat or ramped, or any combination of these geometric features. Further, the scallops can be deployed on either the inner race or the outer race or both as desired.

In a further aspect of the invention, using a biasing mechanism, the wedging element can be placed in a forward position for biasing a device in a forward direction and a reverse position for biasing a device in a reverse position.

In a further aspect of the invention, the wedging element can be placed in a neutral position which allows the inner and outer races to move freely without affecting the other.

Further, due to the fact that the biasing mechanism places very little load on the device as a whole, the device is able to continually transfer force or torque as the force or torque transfer requirements diminish. Thus for example, as a bolt is being loosened with a wrench fabricated according to the invention, the device could continue to loosen the bolt without the load placed on the device by the biasing device or spring interfering with that operation.

BRIEF DESCRIPTION OF THE FIGURES

FIGS. 4a and 4b are schematic representations of a wrench or clutch embodiment of the present invention showing two contact angles.

FIG. 5 is a graph showing an outer contact angle versus a total radial interference for a 2° starting contact angle at no-load.

FIGS. 13a and 13b are alternative embodiments of the invention shown in a linear configuration.

FIG. 14 is a top schematic view of yet another alternative embodiment of the invention wherein the wedging elements have spring reliefs.

FIGS. 15a, 15b and 15c are schematic representations of a spring of a embodiment of the invention.

FIG. 16 is an assembled view of the elements of FIGS. 14 and 15c.

FIGS. 20a through 20d schematically depicted reversible aspects of a roller/sprag, wrench or clutch of an embodiment of the invention.

DETAILED DESCRIPTION OF THE PREFERRED EMBODIMENT

Wrench Embodiment with Rollers

Figures 1, 2:
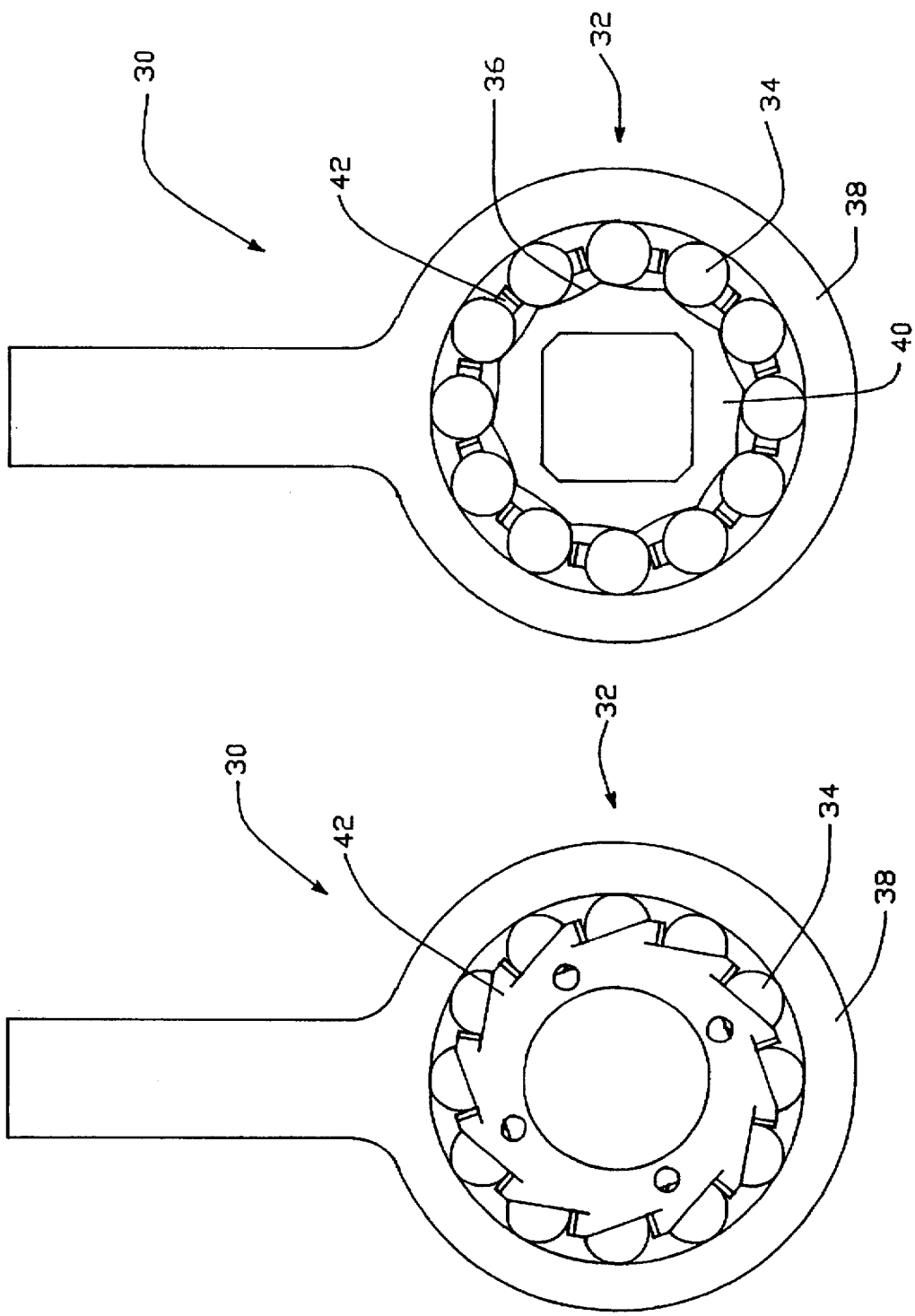
FIG. 1 is a top schematic view of a roller wrench, or clutch of an embodiment of the present invention with the housing removed.
FIG. 2 is a bottom view of the embodiment of FIG. 1 with the housing removed.
Figure 3:
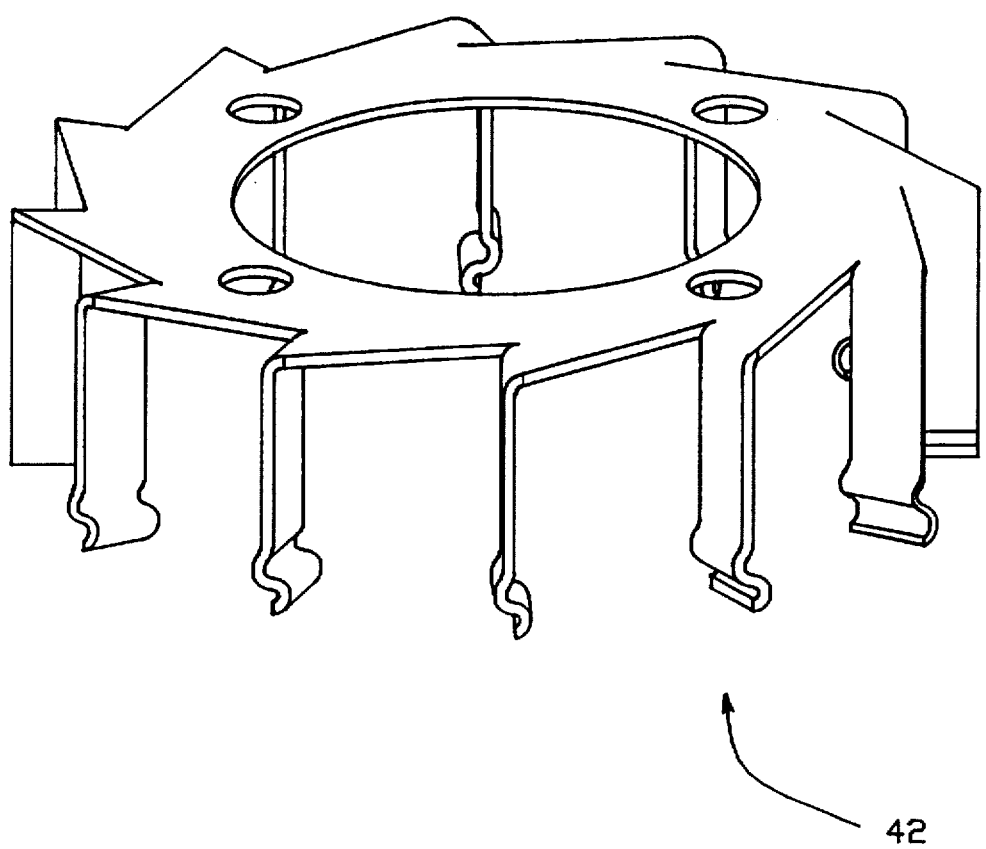
FIG. 3 is a perspective view of a spring biasing mechanism.

The wrench 30 embodiment of the invention described in FIGS. 1 and 2 is a ½ inch drive model which can be scaled to create other drive sizes in the standard inch and metric series. It is to be understood that although this embodiment is described as a wrench, this embodiment could equally well be a clutch or other force transfer device or torque transfer device. This embodiment could also be redesigned to be a linear device. Further, no matter how the below embodiments are described, the inventive concept can be used in any of the above environments. The wrench drive head 32 is within the size envelopes of the standard currently available ratchet wrenches in the market. The wrench 30 uses twelve wedging elements, which in this embodiment are rollers 34, to share the compressive loading due to twelve wedging scallop 36 in the hub. The rollers 34 come into contact with both the outer clutch race 38 and the hub scallops defining a contact angle. Other embodiments employ different numbers of rollers and different contact angles. Other embodiments could alternatively or additionally have scallops on the outer race. By positioning the scallops 36 on the inner hub race 40 rather than in the outer race 38, both of the Hertzian interactions between rollers 34 and bearing surface 36, 38 are of the concave-on-convex type rather than convex-on-convex. This greatly reduces peak stress and allows for more even loading in the system. The roller biasing spring 42 (FIG. 3) is designed to independently drive each roller 34 into proper wedging position to ensure that each roller 34 will engage and the total torque will be shared by all rollers 34. This feature compensates for geometrical imperfections and manufacturing tolerances. By rotating the biasing spring 42, the rollers 34 are moved from one wedging position to the other (i.e., from one end of the scallop to the other), thus changing the operating direction of the wrench. The roller positions can only be changed when the wrench 30 is bearing no torque because the biasing spring supplies very low forces to the rollers. The spring will just deflect, rather than force the rollers, out of their high-load wedging situation.

As evident from the below discussion, the scallops can have a variety of shapes including U and V-shaped and many composite shapes including for example, ramps, curves and flat, and be within the spirit and scope of the invention. Further, the scallops can be cylindrical or spherical in shape.

Figure 2A:
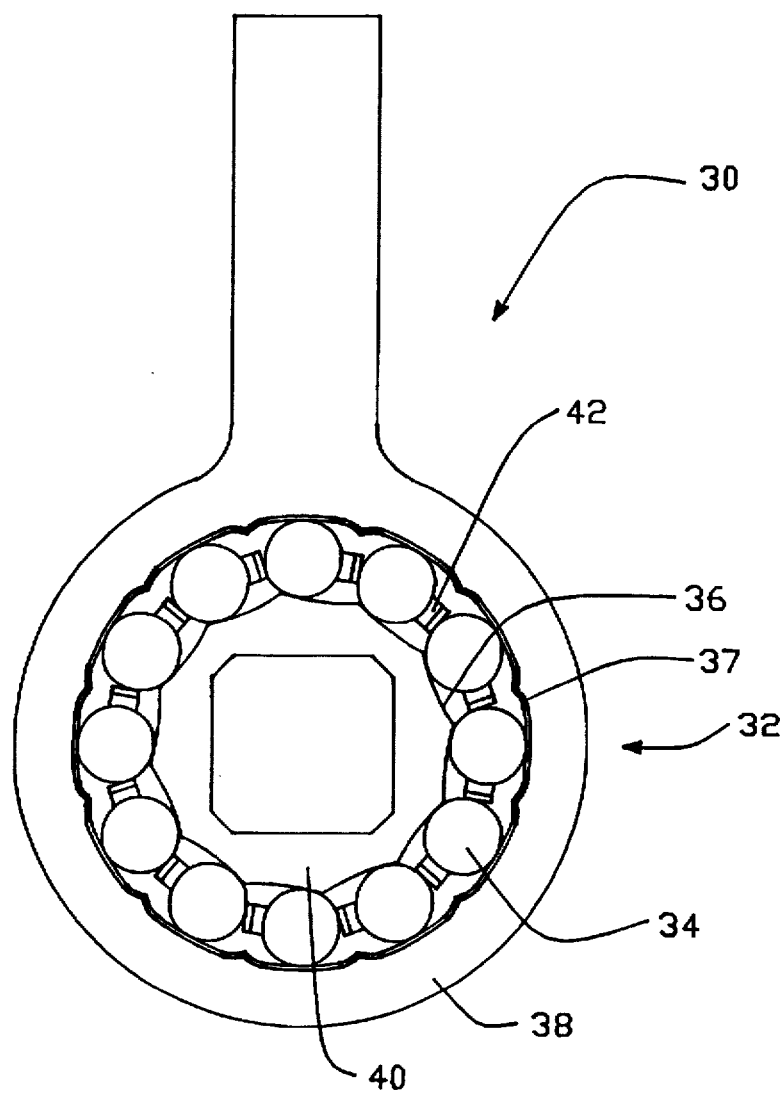
FIG. 2a is similar to FIG. 1 but with scallops on the inner and outer races.

In FIG. 2a, scallops 36, 37 are depicted on the inner race 40 and the outer race 38. Such an embodiment is within the scope of the invention with the advantage of scallops as set out herein.

Torque Transfer Device with Multiple Radii Scallops

FIGS. 4 through 9 explain how a multiple radius scallop force transfer device 44 operates. FIGS. 4a, b, demonstrate two contact angles that are advantageous to this and the other embodiments of the invention as will be explained with respect to these and the following figures. FIGS. 4a, b, demonstrate the outer race contact angle 49 with the roller 50 in two positions relative to the concave scallops 46 of the inner race.

Figure 9:
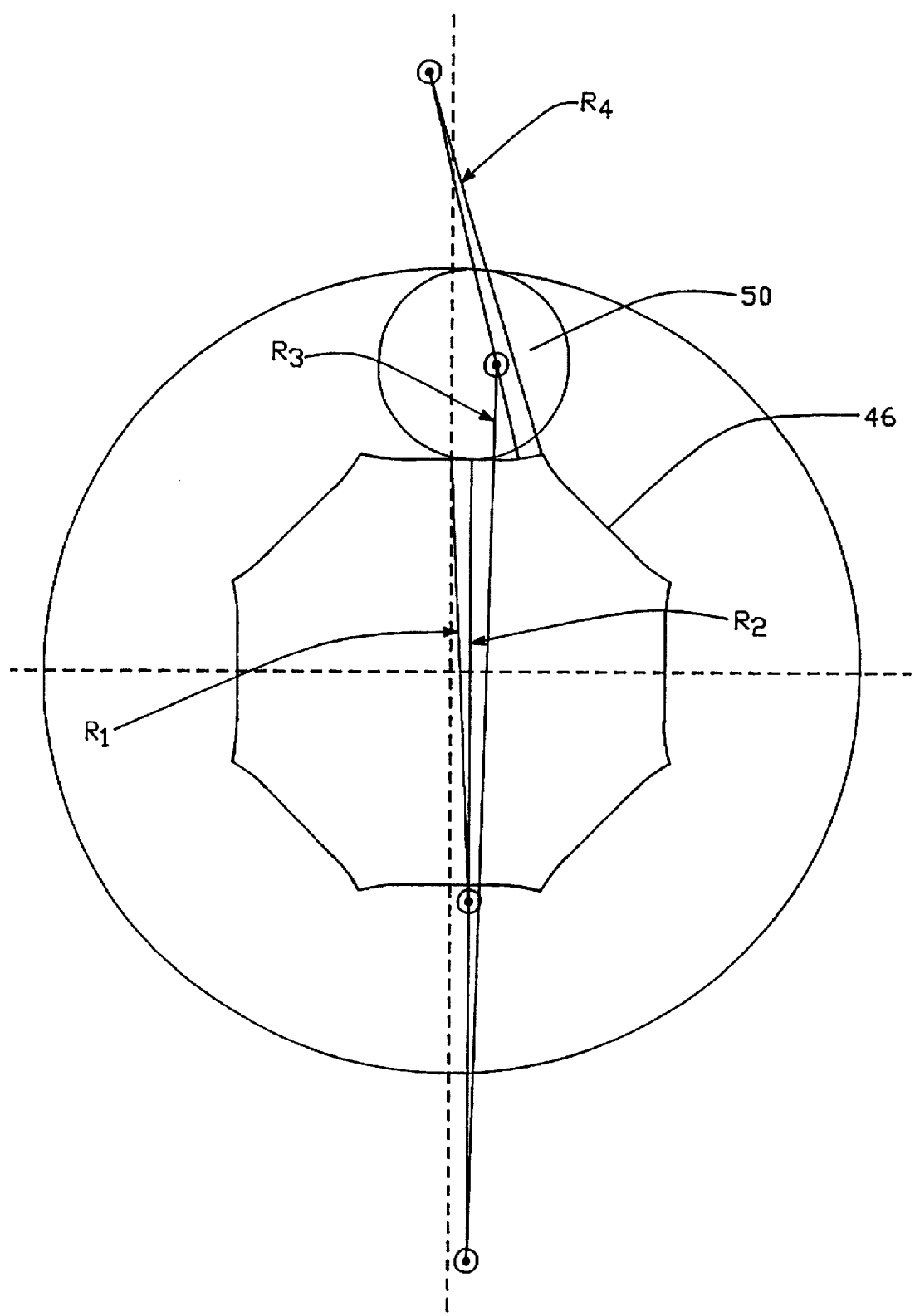
FIG. 9 is a schematic representation of a preferred scallop arrangement on an inner race.
Figure 10:
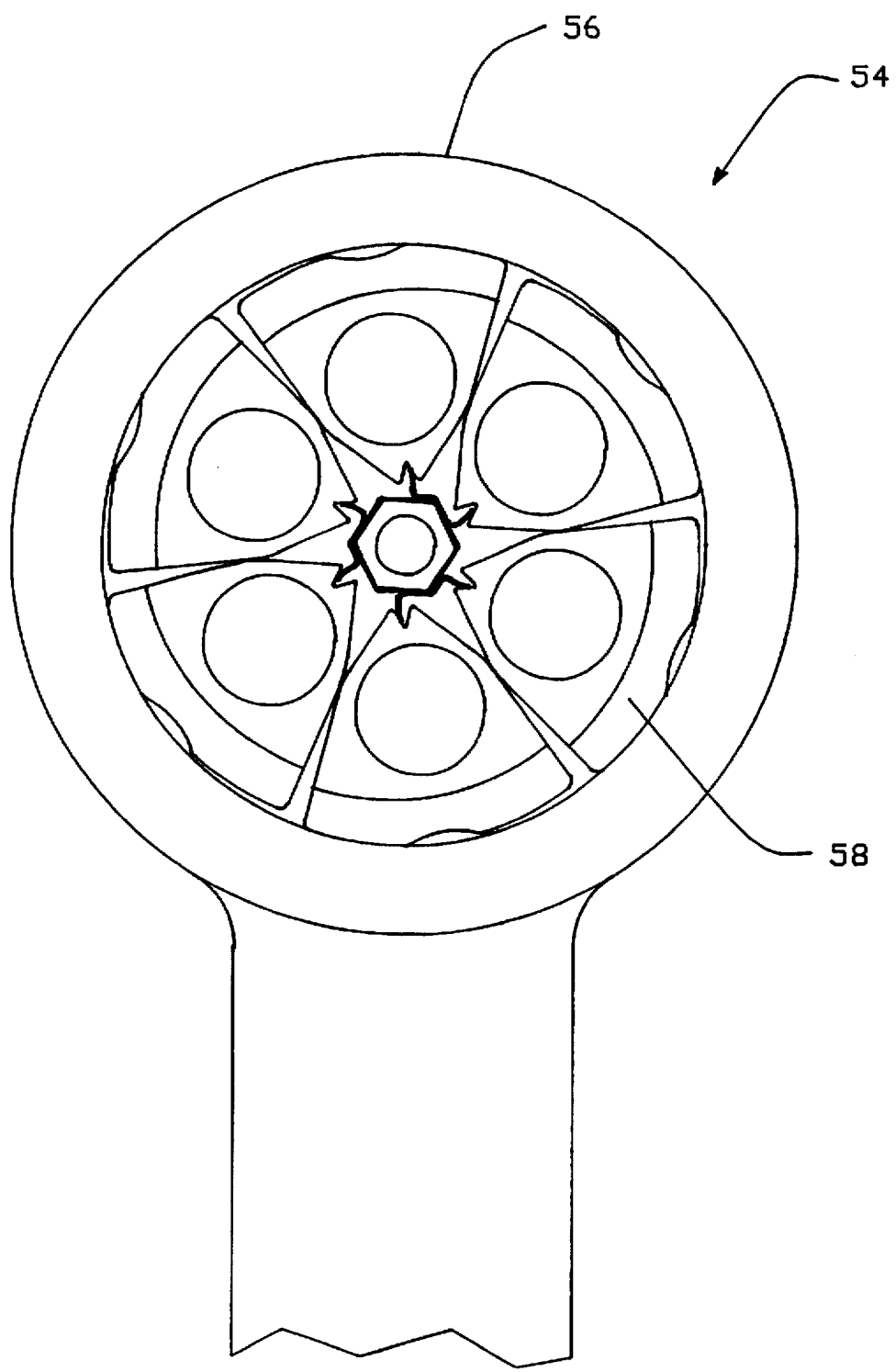
FIG. 10 is an alternative embodiment of a wrench or clutch embodiment of the invention with the housing removed.

FIG. 4a represents the roller 50 relative to the scallop 46 with a small contact angle 49 that would exist as the roller is moved from the neutral position into the zone of radii $R_1$ or $R_2$ of FIG. 9. Point 51 is the outer race contact point. Point 53 is the inner race contact point. Point 55 is the center of the roller 50. Point 57 is the center of the inner race. FIG. 4b represents the roller 50 relative to the scallop 46 with a larger contact angle as the roller is moved through the zone of radii $R_3$ and $R_4$ of FIG. 9. In FIG. 4a the contact angle is low to ensure no slipping between the roller and the race. In FIG. 4b the contact angle is higher in order that the wrench can carry high loads and minimize surface stresses.

FIG. 5 shows a graph of how the contact angle changes when a clutch is loaded. The example is for a clutch with concave, fixed radius scallops. The no load contact angle is 2° which is preferred for this embodiment. The roller, rolls up the scallop as the clutch is loaded due to deformation. This motion puts the roller in a position where it is squeezed between the inner and outer race. The X axis (total radial interference) of the graph is the amount of squeeze or interference between a roller and the inner and outer races. The Y axis is the contact angle between the roller and the outer race (outer contact angle). The graph shows that as the roller rolls up the scallop, it is squeezed, and the contact angle increases. In this example, the roller has a diameter of 5/16 inches, the radius of the scallop is 0.65 inches and the inner diameter of the outer race is 1.3 inches. Also note that at about 0.0035 inches interference, the contact stress is about 450,000 psi and at about 0.0068 inches, the contact stress is about 650,000 psi.

Figure 6:
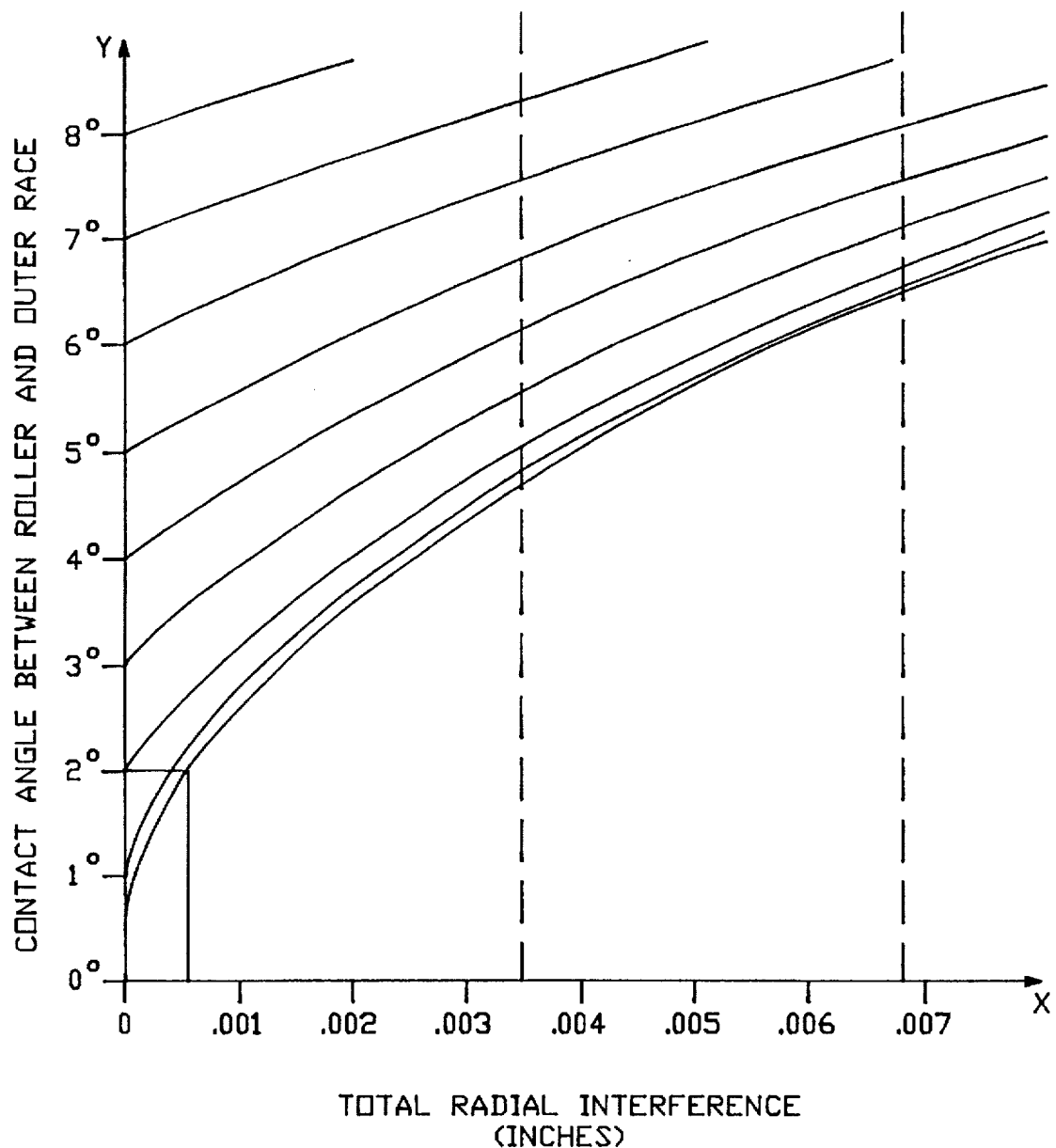
FIG. 6 is a graph similar to that of FIG. 5 for various starting contact angles.

All of the curves in FIG. 6 are symmetrical. For example, the curve with a 2° starting angle is the same as the 0° starting angle curve, only it is shifted by about 0.0005 inches to the left. What this means is that if one designs for a 2° starting contact angle, variation in part size, eccentricities, and bearing clearance will affect the actual contact angle. If there is a diametrical clearance of only 0.001 inch in the bearing that locates the inner race relative to the outer race, the inner race can shift by 0.0005 inch radially. Even if all the other parts are geometrically perfect, scallops on one side of the inner race will be 0.0005 inch closer to the outer race, and scallops on the opposite side of the inner race will be 0.0005 inch further away from the outer race. With a nominal 2° starting contact angle, the actual starting contact angle will be 0° on one side of the inner race and 2.7° on the other side of the inner race.

The starting contact angle is very important. A starting contact angle of 0° corresponds to zero clearance between the parts. At zero clearance, the clutch cannot slip in the reverse direction and it will jam. At an angle greater than approximately 3° or 4°, the roller may slip on the oil film lubricating the parts. It may eventually bite through the film, as the clutch is loaded, but even if it does, all rollers may not grab at the same time, and they will not share the load equally.

FIG. 6 shows that with a fixed 0.65 inch radius concave scallop, the contact angle changes rapidly with radial position of the scallop, for contact angles below 3°.

Figure 7:
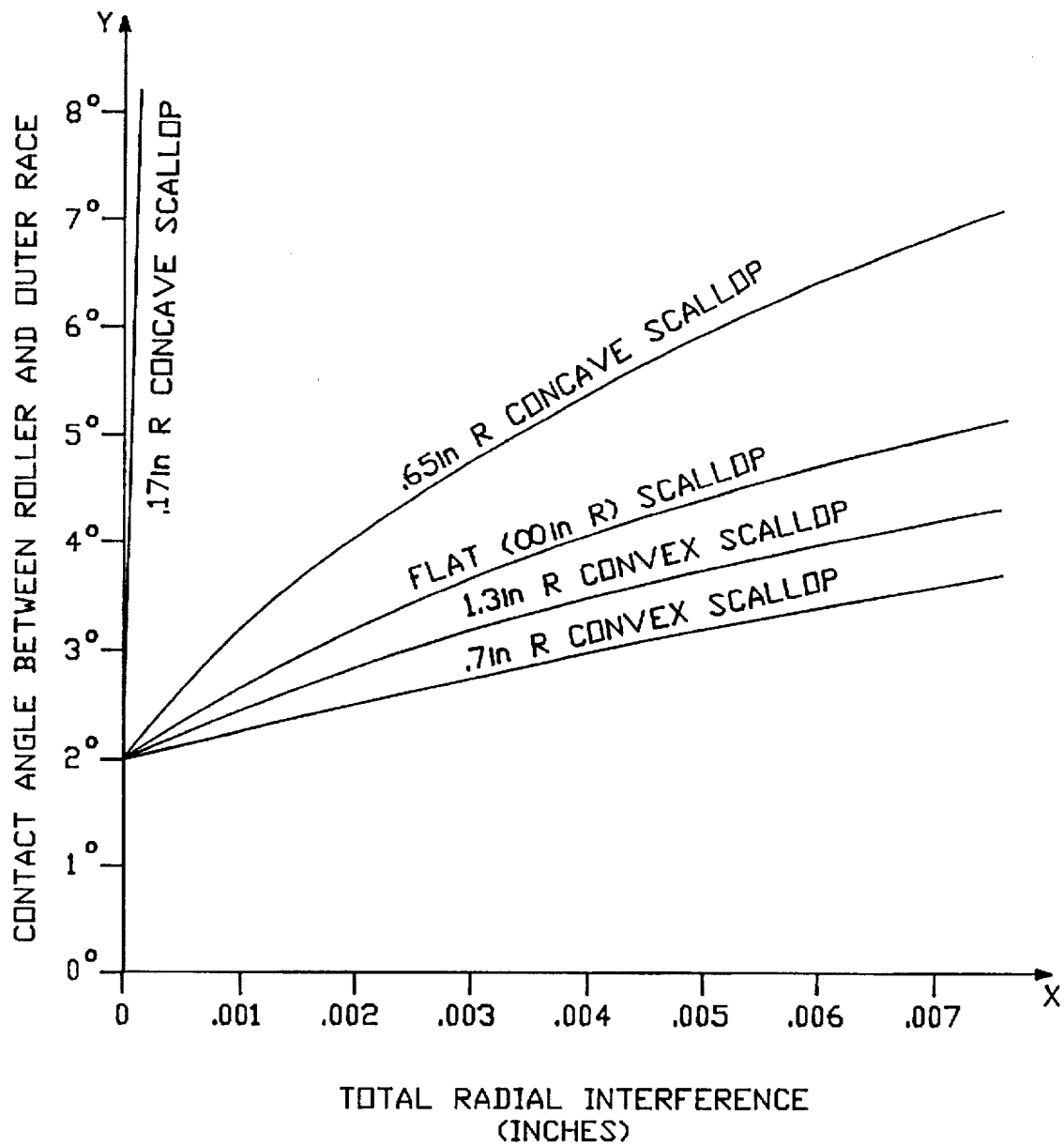
FIG. 7 is a graph of the outer contact angle versus total radial interference for various types of scallops on the inner race.

FIG. 7 shows a graph of contact angle versus radial interference for scallops with different fixed radii. Note that the smaller radius concave scallop results in a contact angle that increases very rapidly. A flat, or infinite radius scallop, results in a contact angle that changes more slowly. If the scallop is convex, the contact angle will change even less. As in the above example for FIG. 5, the roller has a diameter of 5/16 inches, the inner diameter of the outer race is 1.3 inches and the starting contact angle is 2°.

The approximate radial interference corresponding to 450,000 psi contact stress for the various scallop radii is as follows. The contact stress reaches about 450,000 psi at about (1) 0.0023 inches for a 0.7 inch radius convey scallop, (2) at about 0.0025 inches for a 1.3 inch radius convey scallop, (3) at about 0.0031 inches for a flat scallop, and (4) at about 0.0035 inches for a 0.65 inch radius concave scallop. Note that the more convex the scallop, the lower the interference to produce the same stress.

Figure 8:
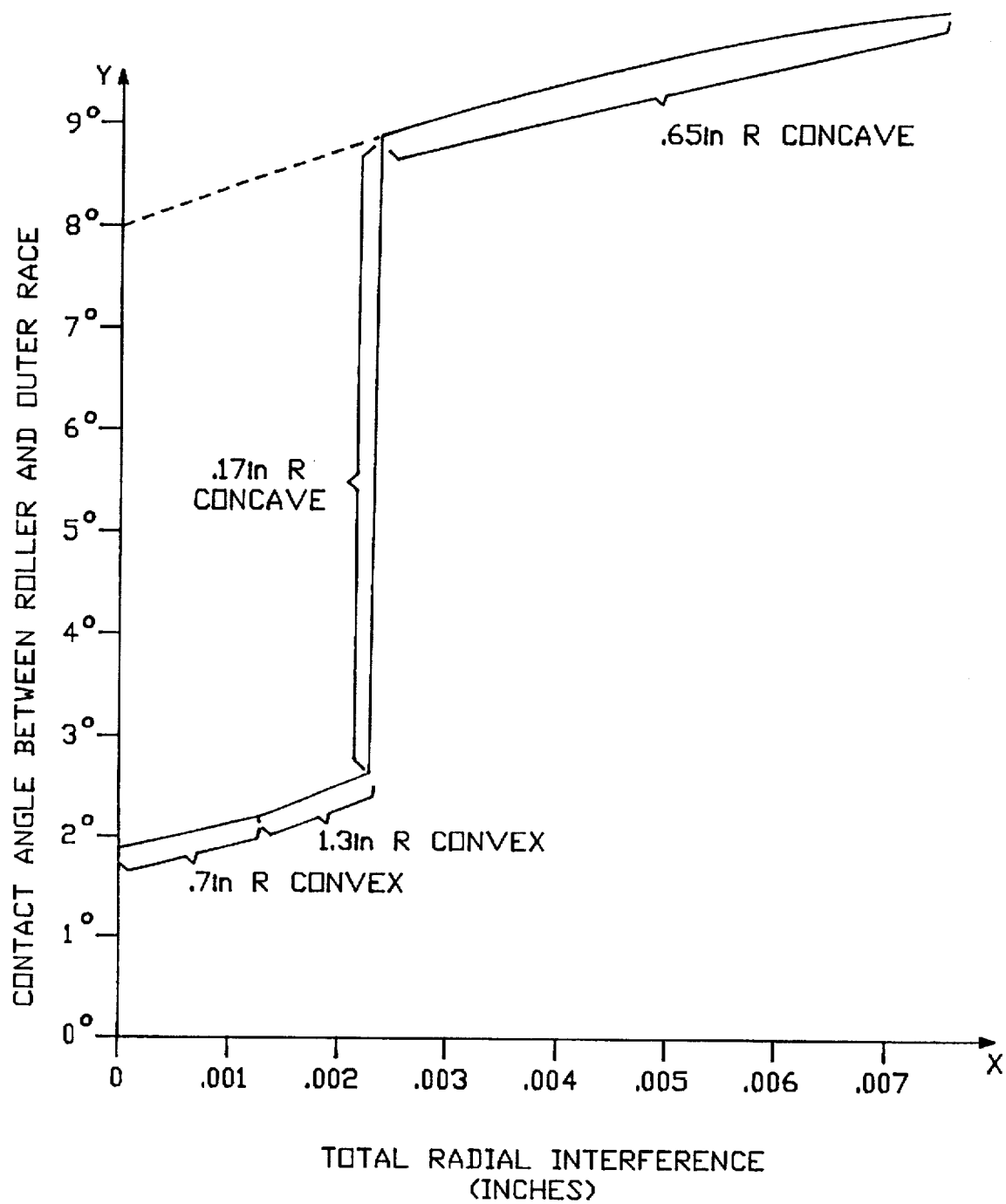
FIG. 8 is a composite of the above outer contact angle versus total radial interference graphs for a preferred scalloped arrangement on an inner race.

FIGS. 8 and 9 put together all of the previous examples. A scallop that starts with a small radius convex surface will produce a contact angle curve that changes very little. As a result, the clutch/wrench or force transfer device will engage reliably. The design will be tolerant of slop in the bearing and tolerances in the parts. The example in FIG. 8 shows a scallop 46 that changes from 0.7 inch convex, $R_1$, to 1.3 inch convex, $R_2$, radius. The larger convex radius $R_2$ helps to keep the contact stress down as the clutch is loaded. The contact angle still does not change very fast with the 1.3 inch radius surface $R_2$. This allows for even larger tolerances and bearing clearances.

The 0.17 inch radius $R_3$ concave surface follows the convex surfaces $R_1$, $R_2$. The contact angle increases very rapidly with the small concave surface, $R_3$. By the time the rollers 50 reaches this concave surface $R_3$, all of the rollers 50 should be engaged and not slipping. Once all of the rollers are engaged, a high contact angle is desired because the forces in the clutch are smaller with higher contact angles. If the 0.17 inch concave radius, $R_3$, continued, the contact angle would rise to a value that would allow the clutch to break loose at high load. Because of this, the short 0.17 inch concave radius $R_3$ is followed by a 0.65 inch radius concave surface $R_4$. This produces a relatively flat contact angle curve safely below a value at which the clutch would slip.

For FIG. 8, the roller has a 5/16 inch diameter and the inner diameter of the outer race is 1.3 inches. As is evident for this embodiment, the wedging elements are all rollers. In other words, the wedging element inner race contact surface and the wedging element outer race contact surface have the same radii with the same center point and hence define a roller.

Stated more generally with respect to FIG. 9, the scallops do not have a constant radius. In this preferred embodiment, each scallop is symmetrical about its centerline. On each side of the centerline, the scallop has four different radii. The starting radius is a convex radius. The next radius has a larger convex radius, and it is tangent on the first radius. The third radius is concave with a radius only slightly larger than the radius of the roller. The third radius is tangent to the second radius. Finally, the fourth radius is concave with a larger radius than the third radius. It is tangent to the third radius. In other words, the center of each scallop configuration is convex and symmetrical about the centerline. On each side of the convex portion are concave portions also symmetrical about the centerline. While this embodiment shows four different sections, two convex, and two concave, on each side of the centerline, any number of sections can be placed on each side of centerline and come within the spirit of the invention.

Thus, the basic concept is to define a complex scallop shape which shape accomplishes reliable wedging element engagement and loading without slipping, or uneven load sharing as the wedging element moves along the scallop during loading and use. In the embodiment in FIG. 9, the quick change from a convex shape to a small concave surface helps to get the contact angle high to get the forces down before too high a level is reached on the race surface stresses. The quick change to a larger concave surface at the end keeps the contact angle from getting too large where the clutch would slip.

The roller in FIG. 9 is shown in a position corresponding to no load on the clutch. A spring (not shown), would push the roller to the right so that the roller touches both the inner race and the outer race. The clutch is loaded, by rotating the inner race counterclockwise relative to the outer race. When the clutch is loaded, the roller rolls along the inner race scallop as deformation increases. The roller rolls along the four curves in succession, as the torque is increased.

In this preferred embodiment, the races are formed of 8620 hardened alloy steel. Preferably, the races are case hardened to Rockwell C60 at a depth of 20 mils. The core of the race is hardened to Rockwell C40. The rollers are 52100 hardened alloy steel.

Wrench Embodiment with Cam-Shaped Wedging Element

Figure 11:
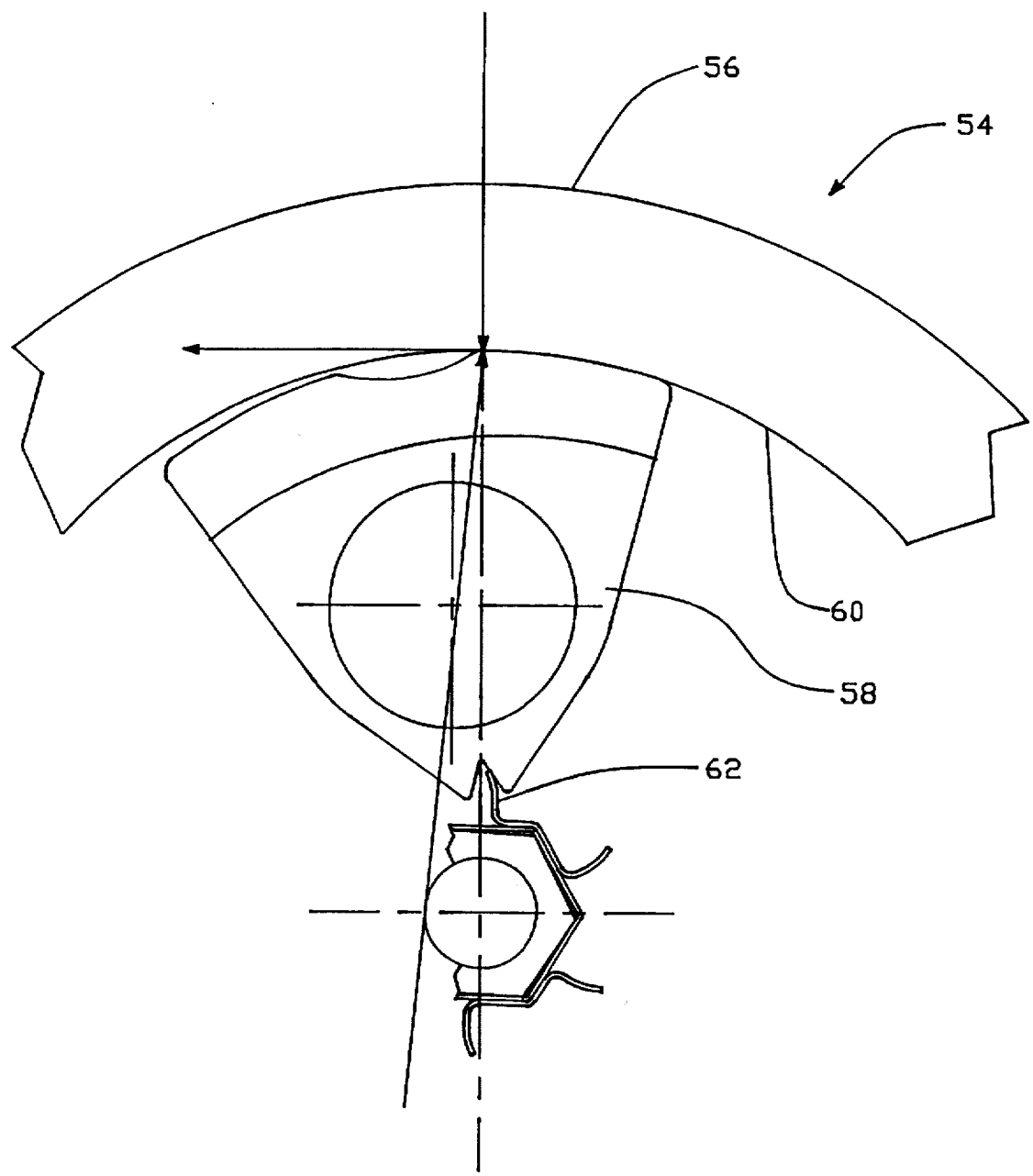
FIG. 11 is an enlargement of a portion of the embodiment of FIG. 10.

The cam wrench 54 described here is a ½ inch drive model which can be scaled to create other drive sizes in the standard inch and metric series. The wrench drive head 56 is within the size envelopes of the standard currently available ratchet wrenches in the market. The wrench 54 uses six wedging elements or cams 58 to share the compressive loading due to wedging against the wrench outer race 60 and their respective pivot pins 62 (FIG. 11). Each cam 58 comes into contact with both the outer clutch race 60 and its pivot pin 62 with an action angle of preferably 6°. By approaching a matching radius of curvature of the cam 58 to the radius of the outer clutch race 60, Hertzian stresses are greatly reduced in favor of standard surface bearing stresses. This greatly reduces peak loading. The cam biasing spring (such as shown in outer embodiment) is designed to independently drive each cam into proper wedging position to ensure that each will engage and the total torque will be shared by all cams. This feature compensates for geometrical imperfections and manufacturing tolerances. By rotating the biasing spring, the cams 58 are moved from one wedging position to the other, thus changing the operating direction of the wrench.

The cam 58 positions can only be changed when the wrench is bearing no torque because the biasing spring supplies very low forces to the rollers. The spring will just deflect rather than force the cams out of their high-load wedging situation.

To achieve ANSI/ASME torque carrying capabilities, the bearing stresses are near the yielding limits of many common steels. Under a torque of 4000 inlbs, contact stresses in the 120 ksi range will be seen. High strength alloy steels with case hardened surfaces are used for the cams, wrench body, pivot pins, and other load bearing components of the mechanism to withstand these loads.

Force Transfer Device with Cam-Shaped Wedging Element and a Scalloped Race

Figure 12:
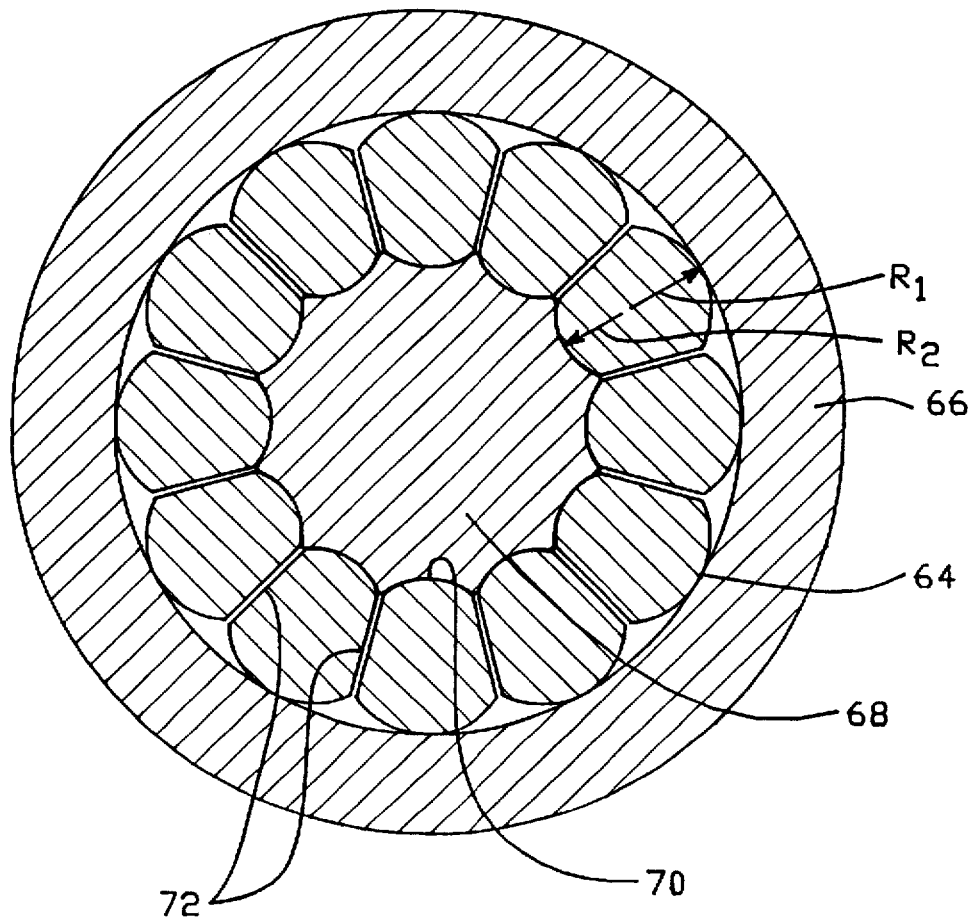
FIG. 12 is a schematic representation of yet a further alternative embodiment of the wrench or clutch of the invention.

In this embodiment, the wedging elements 64 can have a constant diameter with different radii of curvature on each side. As can be seen in FIG. 12, the larger radius $R_1$ of the outer surface of the wedging element, and the smaller radius $R_2$ of the inner surface wedging element start from the same center and thus describe a constant diameter. The larger radius of curvature against the outer race 66 will lower the contact stress on the outer race. The scallops 68 on the inner race 70 will keep the contact stress down.

A flat 72 on one or both sides of each wedging element 64 provide room for more contact points. This will lower the contact stress. Other combinations are possible, for example, some wedging elements could have flats and some could be round.

Figure 17:
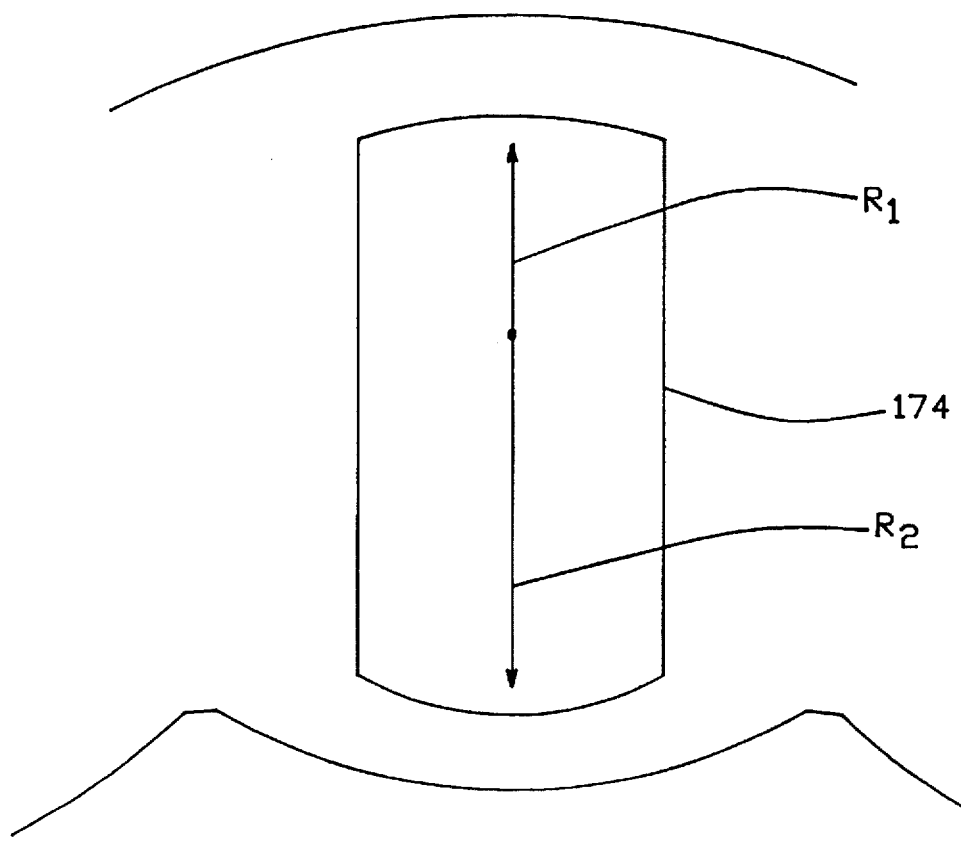
FIG. 17 is an alternative embodiment of a wedging element of the invention.
Figure 18:
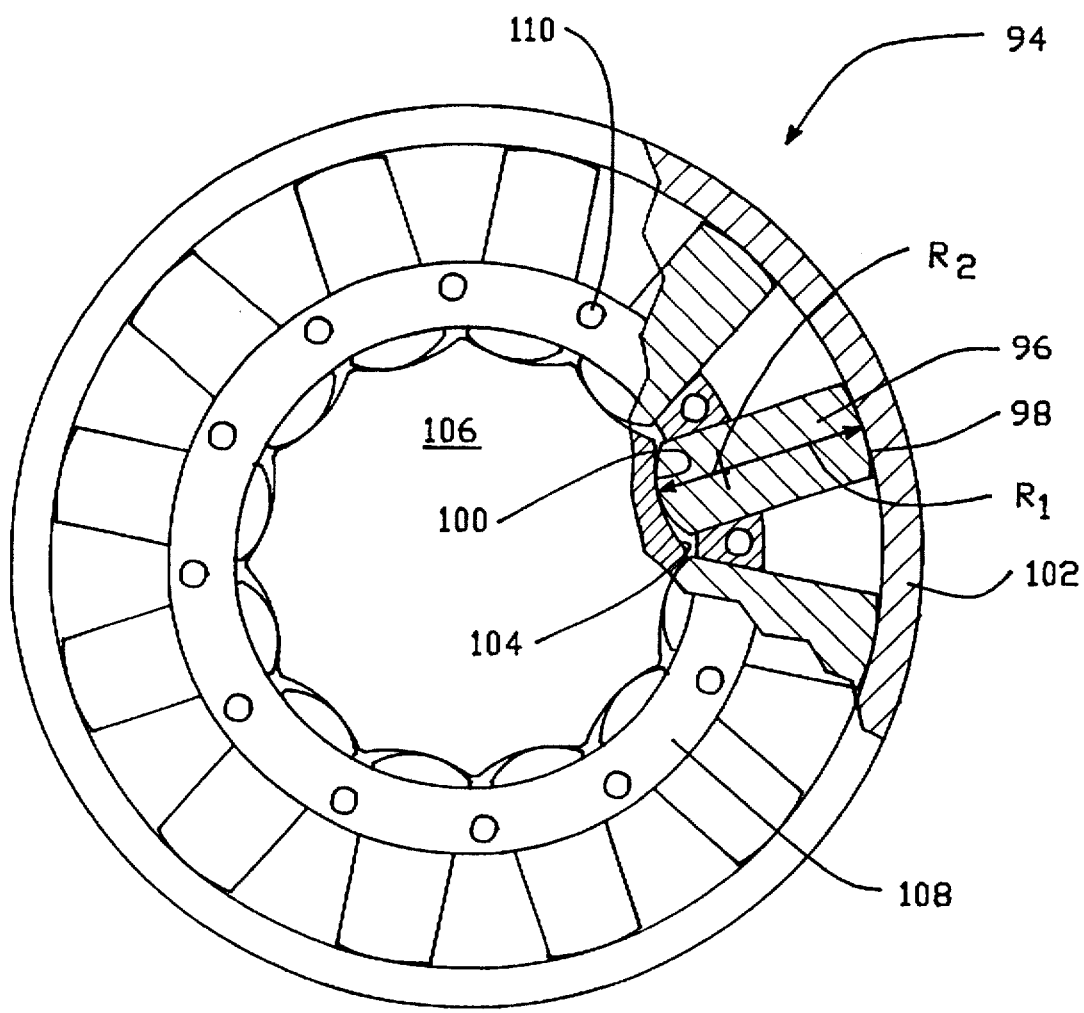
FIG. 18 is yet another alternative embodiment of the wrench or clutch of an embodiment of the invention shown in top view with the housing removed.

The devices depicted includes an inner race 70 and an outer race 66 and a plurality of cam-shaped wedging elements 64. It is to be understood that this device can used, for example, as part of the drive mechanism of a wrench or to transfer force or torque from one moving part to another such as would be accomplished with a clutch. In FIG. 17, the wedging element 74 is between outer race 76 and inner race 78. The sprag has radii $R_1$ and $R_2$ which are defined through fixed but spaced apart centers. This embodiment describes a sprag (a wedging element which does not have a constant diameter across the contact surfaces).

Figure 13B:
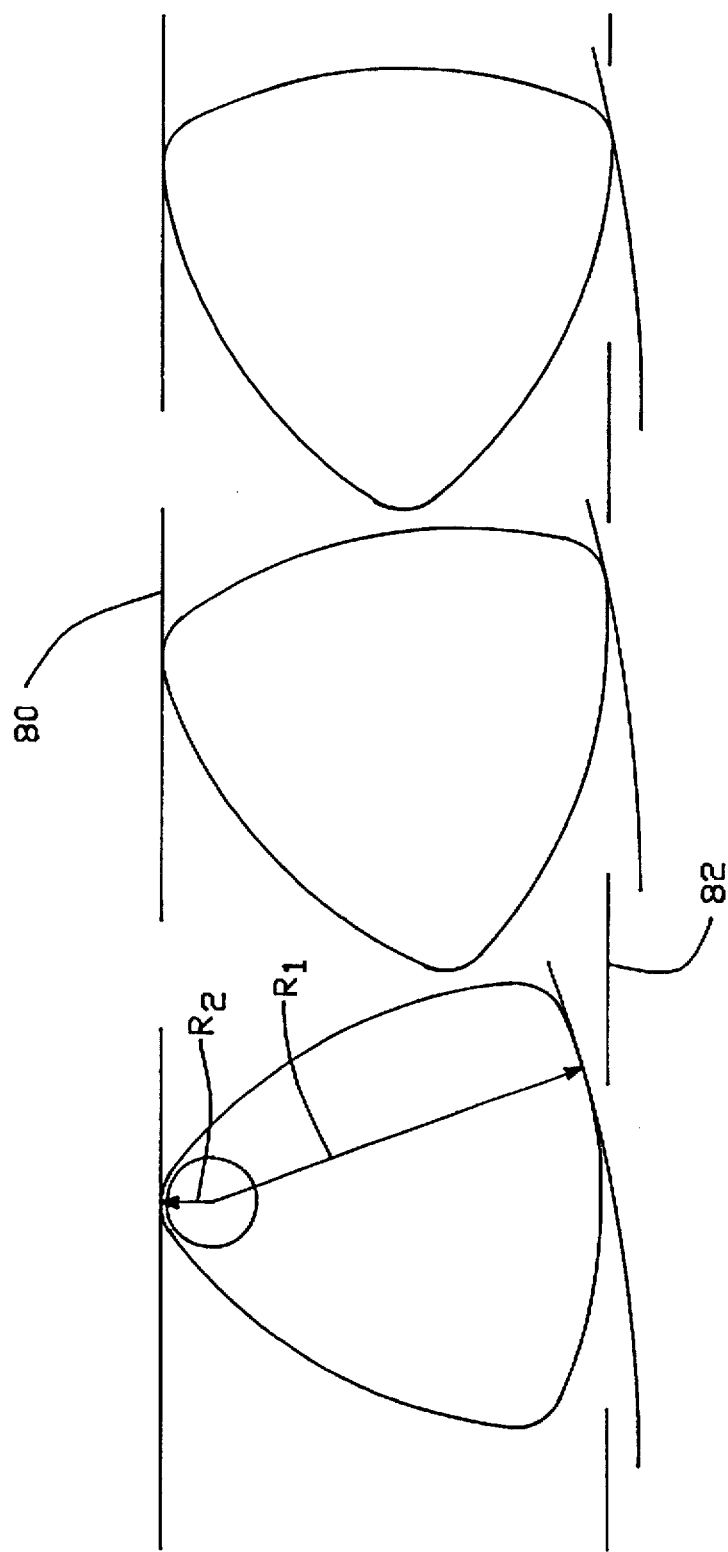

Turning to FIGS. 13a and 13b, several elements of this embodiment of the invention are depicted. First it is seen that the inner races 80 and outer races 82 are, straightened out, and provided parallel to each other. This demonstrates this embodiment as well as the other embodiment do not need to be provided between centric and circular races. Straight or parallel races with wedging element therebetween also falls within the scope and spirit of the invention. In this embodiment the inner races are scalloped. Such linear devices could be used, for example, as a braking device or as an anti-kickback device.

As can be seen in FIGS. 13a and 13b, the constant diameter maintained between the surfaces which contact the upper and lower parallel races. It is to be noted that a variety of shapes can be defined which maintain this constant diameter (using radius $R_1$ and $R_2$), and thus falls within the spirit and scope of the invention.

Another embodiment of the forced transfer device 84 with cam-shaped wedging elements is shown in FIGS. 14 through 16. In this embodiment, it is evident that the wedging elements 86 are somewhat flared-shaped with the wedging elements having first and second spring cavities 88, 90 for use to receive the spring 92 which can bias the sprags 86 in a forward or reverse direction.

FIGS. 15a, 15b, and 15c depict the formation of a spring 92 which could be used with such a forced transfer device as depicted in FIG. 14. The spring 92 can be stamped for example out of appropriate materials as shown at FIG. 15a, and then the individual springs can be bent into position as shown in FIG. 15b. Two of these devices can then be merged together to double the number of springs as shown in FIG. 15c. This arrangement can then be placed in the force transfer device as shown in FIG. 16 in order to bias the sprags in a forward or reverse direction.

The springs supply a restoring force to each wedging element, helping the element to retain proper orientation.

Force Transfer Device with Dual/Sprag Arrangement

Figure 21:
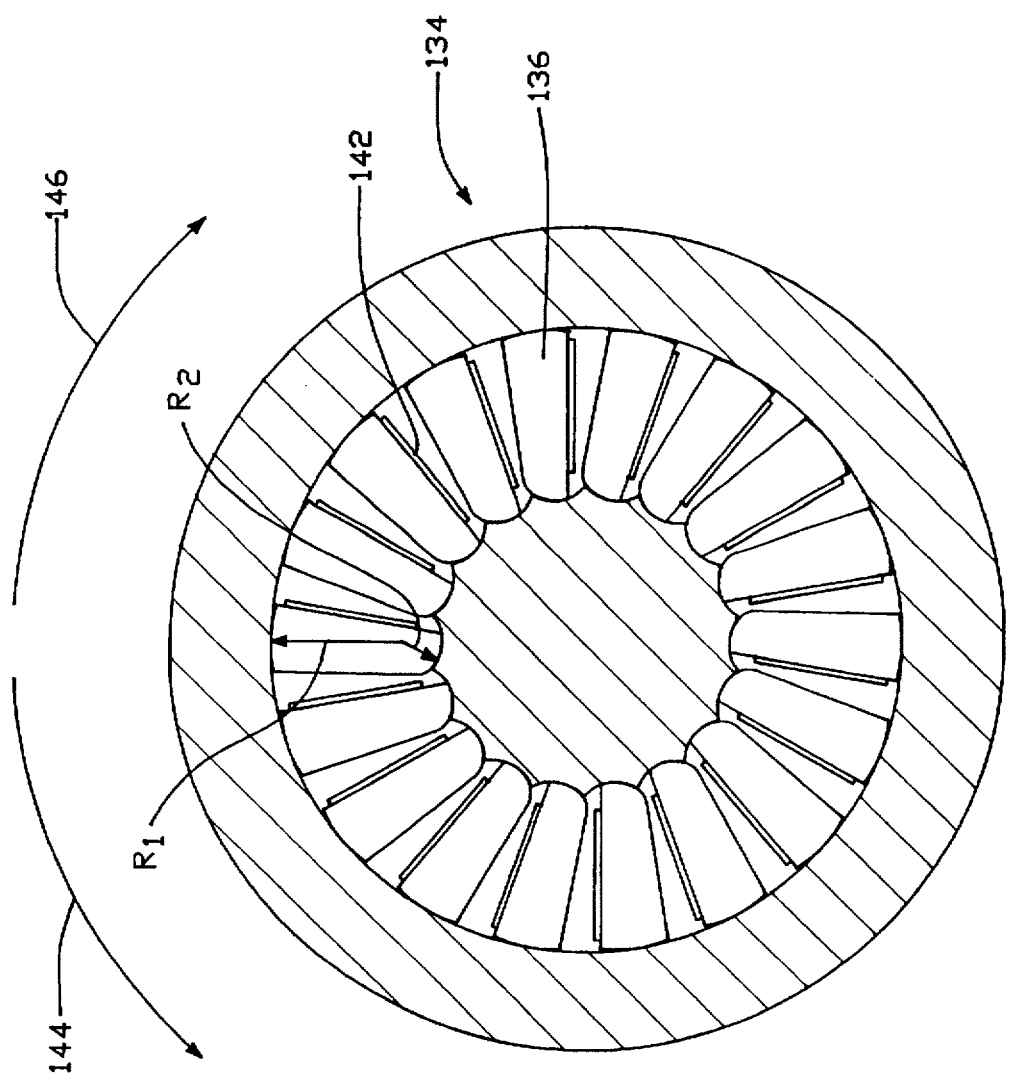
FIG. 21 depicts an alternative embodiment of the invention which is not reversible.

Another embodiment of the invention can be configured using the wedging element arrangement of any of the outer embodiments hereof. By using two of these devices and placing them for example back to back, a reversible device can be configured and have more load carrying capability with the increase in the number of wedging elements. Such an arrangement is more expensive however, and the tradeoff is a greater load carrying capability but at increased volume. In this arrangement, one device would be set to drive in a forward direction, while the other device was in neutral. Then, the other device would be used to drive in a reverse direction, while the first device was in neutral. A combination of two unidirectional force transfer devices as depicted in FIG. 21 could be used to create this device.

Force Transfer Device with Wedging Element Contact Surfaces Having Different Radii This embodiment of the wedging element device, clutch or wrench 94 uses 12 wedging elements 96, each of which has two radially shaped faces or surfaces ($R_1$, $R_2$), with a common center of arc. The outer face 98 has a larger radius ($R_1$) of curvature than the radius ($R_2$) inner face 100 to reduce the Hertzian stresses against the large radius of the outer cylindrical race 102. The inner faces 100 of the wedging elements 96 have smaller radii ($R_2$) and act against scallops 104 on the inner race 106. By choosing these radii ($R_1$, $R_2$) carefully, the levels of Hertzian stresses on the outer and inner races 102, 106 can be optimized for greatest possible load carrying can be seen in this embodiment, the radius of the scallop 104 is close in size to the radius $R_2$, the face 100 of the wedging element contacting scallop 104. The scallop can preferably have a radius which is about equal to or larger than that of the radius $R_2$ of the face 100. The wedging elements 96 are located positionally by a flexible elastomeric ring 108. This flexible ring or cage 108 keeps the wedging elements 96 radially oriented but the ring flexes to allow some torsional rotation of the wedging elements about their center of radii. By forcing the wedging elements 96 toward either side of the scallops 104, the device 94 can act as a one-way over-running clutch in either direction of rotation. The wedging elements 96 will wedge when the outer race 102 is driven such that the wedging elements 96 try to roll up the scallop 104 (which the wedging elements cannot do), and it will back slip when the outer race 102 forces the wedging elements 96 to roll down the scallop 104 (which the wedging elements can do). A set of driving members 110 cast into the flexible ring between the wedging elements can be used to bias the cage in either direction relative to the inner race, thus determining which direction the wrench, clutch or device 94 will operate. This device 94 could be used in a socket driving wrench. All of the wedging elements are depicted locked in a forward direction. Accordingly, turning the outer race causes the inner race to turn and not slip relative to the outer race.

Force Transfer Device with Wedging Element Spring Biasing Mechanism

This embodiment (FIG. 19) of the wedging element clutch 102 uses 12 wedging elements 114, each of which has two radially shaped faces ($R_1$, $R_2$) with a common center of arc and with a wedging element positioning device including a spring 116 located between individual wedging elements 114. These springs 116 are wishbone-shaped and symmetrical in this embodiment. Otherwise, this embodiment is similar to the prior embodiment. The wedging elements 114 are located positionally by a ring of springs 116. These springs 116 keep the wedging elements 114 radially oriented, but the springs allow some torsional rotation of the wedging elements about their center of radii. By forcing the wedging elements toward either side of the scallops, the clutch can act as a one-way over-running clutch in either direction of rotation as discussed above.

Figure 19:
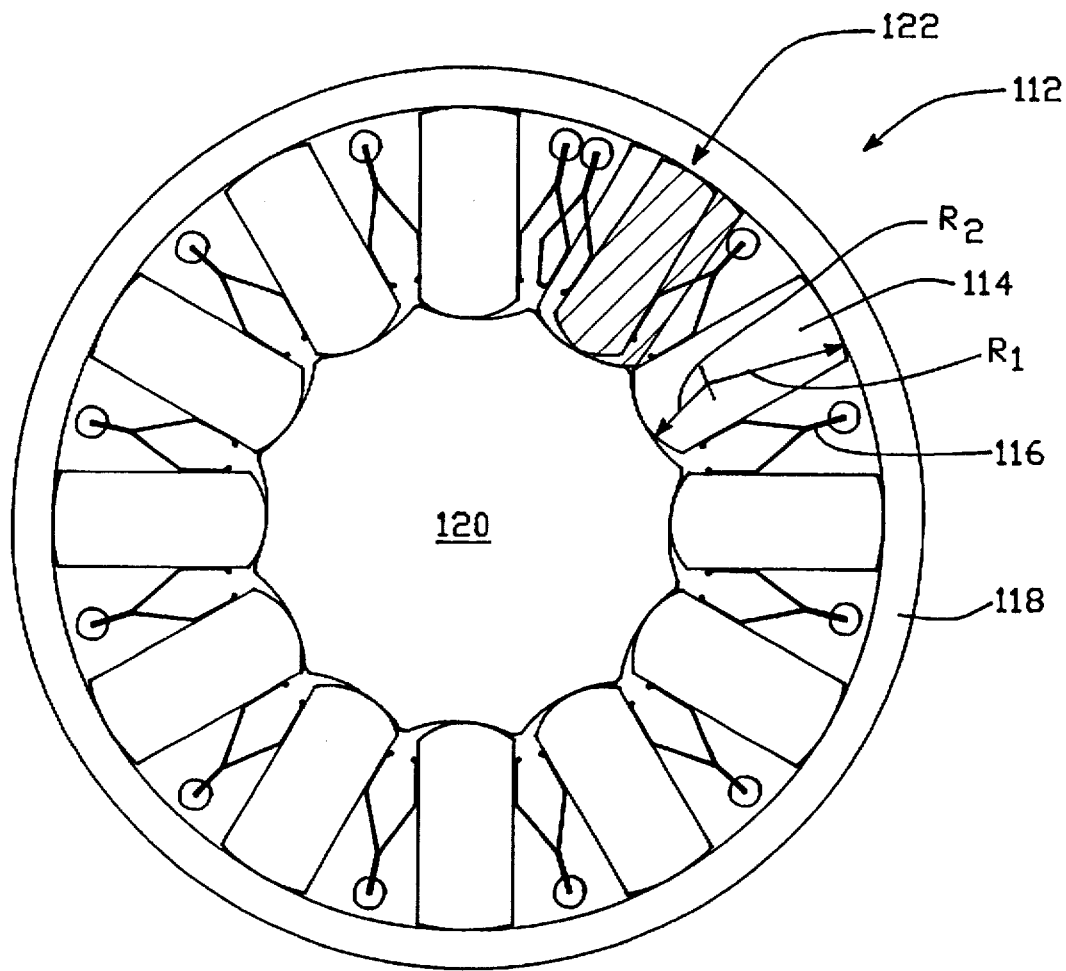
FIG. 19 is an alternative embodiment of the embodiment of the invention of FIG. 18.

FIG. 19 depicts in all of the wedging elements locked in a forward direction. Thus, as the outer race 118 turns, the inner race 120 turns in the same direction (counterclockwise). FIG. 19 depicts one wedging element 122 also positioned in a reverse locking position. With all the wedging elements in the reverse locking position, the outer race 118 causes the inner race 120 to turn but now in the opposite direction (clockwise).

Reversible Force Transfer Device

Figure 20A:
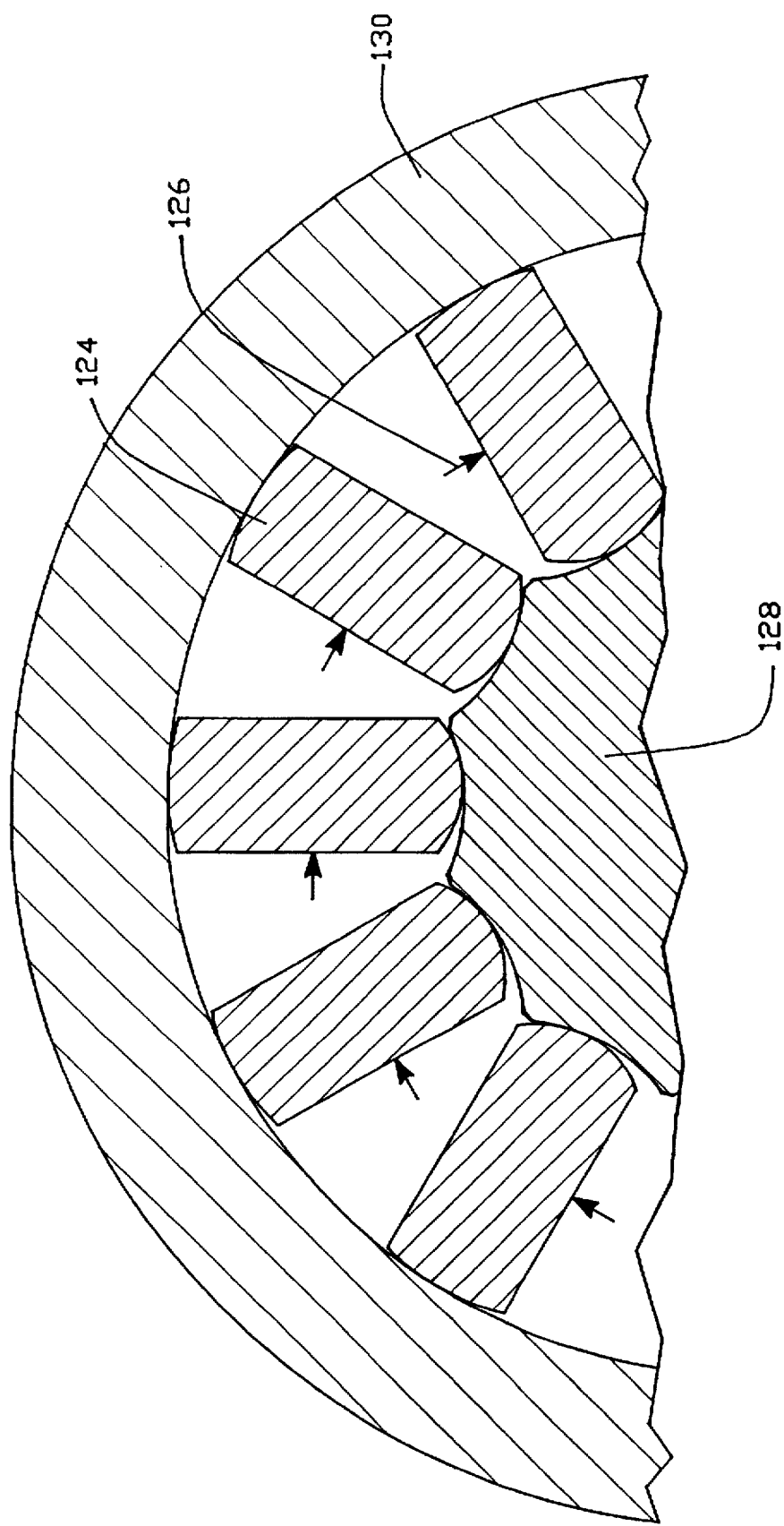

In FIG. 20a, each wedging element 124 is pushed by a spring (schematically 126). The arrows show the direction of the force on each wedging element. Note that the forces are all clockwise relative to the inner race 128. In this configuration, the outer race 130 can rotate counterclockwise relative to the inner race 128. If the outer race 130 is rotated clockwise, it will lock to the inner race 128 and drive it clockwise.

Figure 20B:
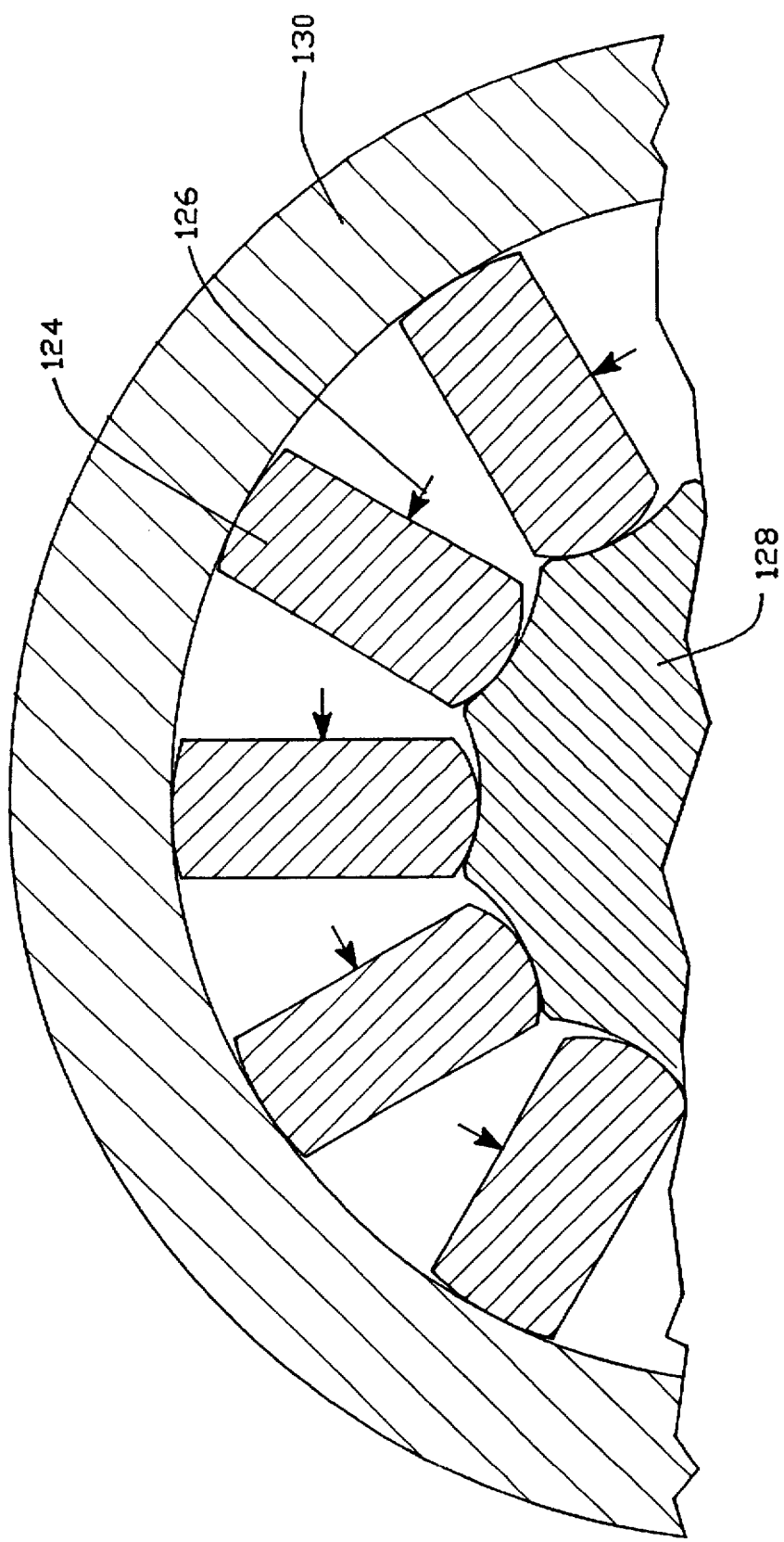

In FIG. 20b, each wedging element is pushed by a spring 126. The arrows show the direction of the force on each wedging element. Note that the forces are all counterclockwise relative to the inner race 128. In this configuration, the outer race 130 can rotate clockwise relative to the inner race 128. If the outer race 130 is rotated counterclockwise, it will lock to the inner race 128 and drive it counterclockwise In FIG. 20c, the wedging elements 124 are located at positions between the clockwise and counterclockwise limits shown in FIGS. 20a and 20b. In this configuration, the wedging elements cannot bridge the gap between the inner race 128 and outer race 130. As a result, the outer race is free to rotate in either direction relative to the inner race.

Figure 20D:
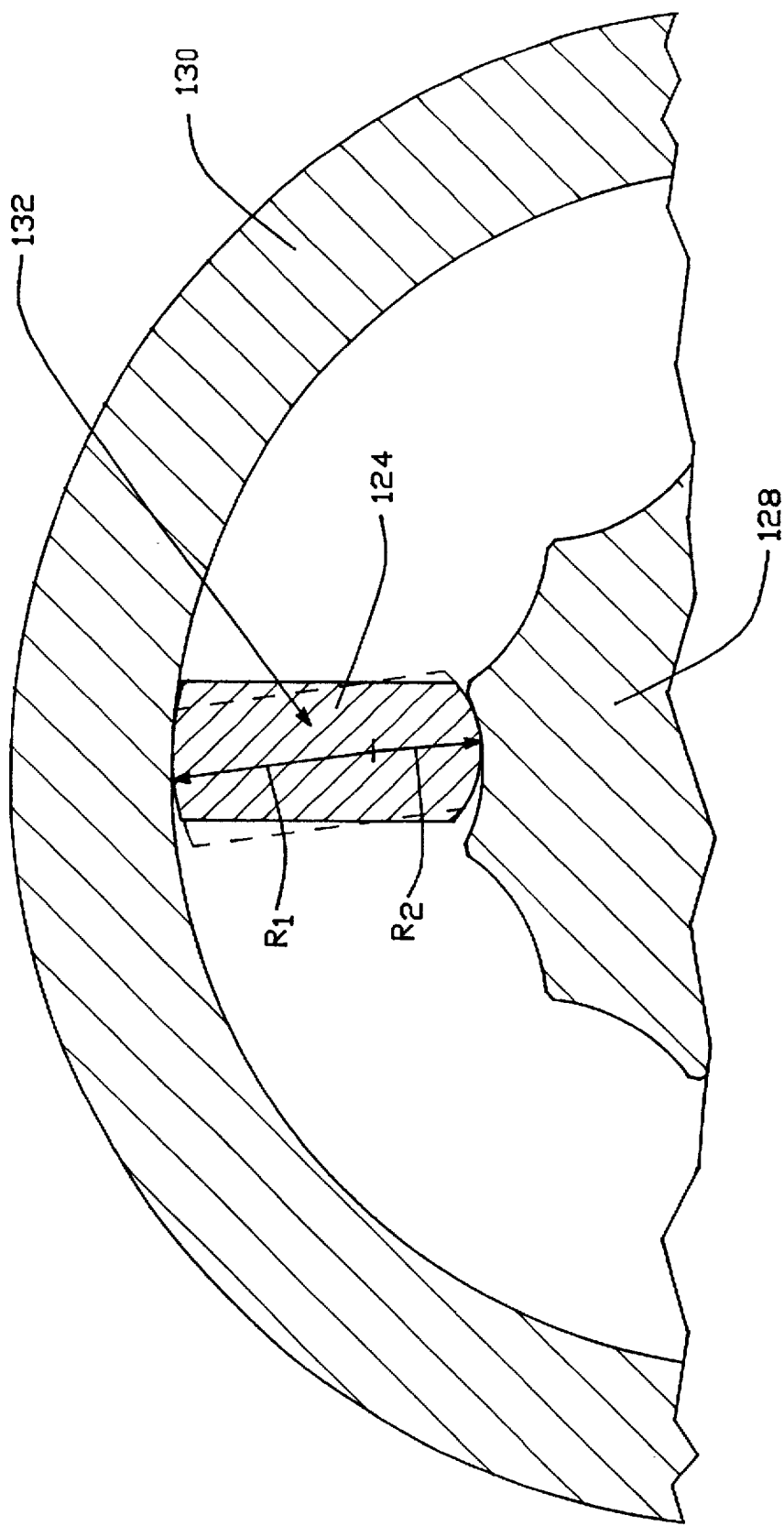

In FIG. 20d, only one wedging element 124 is shown for clarity. The view shows how the contact between the wedging element and both races is unaffected by the angular orientation of the wedging element as the wedging element is of a constant diameter. A line 132 drawn between contact points on the inner race and the outer race is depicted. If the contact angle was affected by the angular orientation of the wedging elements, then the orientation would have to be controlled to keep the contact angle within acceptable limits. Too small a contact angle will overstress the parts. If the contact angle is too large, the clutch will slip.

Unidirectional Force Transfer Device

This embodiment depicts a unidirectional force transfer device 134 which allows for a stronger design. Each wedging element 136 has a large and small radius ($R_1$, $R_2$) surface with a common center line. With this unidirectional design, it is possible to fit in about 50% more wedging elements than with the reversible design. The unidirectional design is about 50% stronger than the reversible clutch. In this embodiment, the unidirectional wedging elements 136 are located between inner race 138 and outer race 140. A plurality of flat springs 142 push each wedging element 136 in the counterclockwise direction to secure the wedging element in contact with both the inner and outer race surfaces. In the counterclockwise direction of arrow 144, the wedging element locks the outer and inner races so that the inner race turns counterclockwise with the outer race. In the clockwise direction of arrow 146, no locking occurs and the inner race rotates freely relative to the outer race.

Industrial Applicability

As can be seen from the above, the present reversible wedging element infinitely variable force transfer device has a number of applications as both a wrench or clutch and also a device for transferring force and motion between a drive an a driven part. Such a device can be used with motors as well as with hand tools. Further, such a device can be configured in a concentric configuration as well as a linear configuration.

Other aspects, objects and advantage of the invention can be obtained from a review of the claims and the appended figures.

It is to be understood that other embodiments of the present invention can be fabricated and fall within the spirit and scope of the invention.

We claim:

1. A force transfer device comprising:

an inner race;

an outer race;

a plurality of reversible wedging elements located between the inner race and the outer race;

wherein at least one of said inner race and said outer race includes a plurality of scallops;

wherein the scallops have a central convex surface with first and second ends and with first and second concave surfaces located at the first and second end of the convex surface respectively;

said central convex surface includes a small radius convex surface that allows the wedging elements to engage with the inner and outer races quickly, and third and fourth larger radius convex surfaces located respectively between the small radius convex surface and the respective first and second concave surfaces, with the radius of the third and fourth larger radius convex surfaces being larger than the radius of the small radius convex surfaces, which third and fourth larger radius convex surfaces keep contact stress down as the device is loaded; and said first and second concave surfaces each include fifth and sixth concave surfaces, with the radius of the fifth concave surface being smaller than the radius of the sixth concave surface, and with the fifth concave surface located adjacent each of the third and fourth larger radius convex surfaces, and the fifth concave surface for causing high contact angles with reduced loading forces.

2. A force transfer device comprising:

an inner race;

an outer race;

a plurality of reversible wedging elements located between the inner race and the outer race;

wherein at least one of said inner race and said outer race includes a plurality of scallops;

wherein the scallops have a central convex surface with first and second ends and with first and second concave surfaces located at the first and second end of the convex surface respectively;

said central convex surface includes a smaller radius convex surface, and third and fourth larger radius convex surfaces located respectively between the small radius convex surface and the respective first and second concave surfaces, with the radius of the third and fourth larger radius convex surfaces being larger than the radius of the small radius convex surface; and said first and second concave surface each include fifth and sixth concave surfaces, with the radius of the fifth concave surface being smaller than the radius of the sixth concave surface, and with the fifth concave surface located adjacent each of the third and fourth larger radius convex surfaces.

\* \* \* \* \*